US012771887B2

(12) United States Patent
Velasco et al.

(10) Patent No.: US 12,771,887 B2
(45) Date of Patent: *Oct. 20, 2026

(54) FAST SWITCHING USING VARIABLE REFRESH RATE IN A REPEATER ENVIRONMENT

(71) Applicant: Crestron Electronics, Inc., Rockleigh, NJ (US)

(72) Inventors: Adolfo Velasco, Dumont, NJ (US); Agesino Primatic, Pittstown, NJ (US)

(73) Assignee: Creston Electronics, Inc., Rockleigh, NJ (US)

( * ) Notice: Subject to any disclaimer, the term of this patent is extended or adjusted under 35 U.S.C. 154(b) by 35 days.

This patent is subject to a terminal disclaimer.

(21) Appl. No.: 19/098,304

(22) Filed: Apr. 2, 2025

(65) Prior Publication Data

US 2025/0234054 A1 Jul. 17, 2025

Related U.S. Application Data

(63) Continuation of application No. 18/212,251, filed on Jun. 21, 2023, now Pat. No. 12,294,749.

(51) Int. Cl.

| | |
|---|---|
| ***H04N 21/438*** | (2011.01) |
| ***H04N 21/2343*** | (2011.01) |
| ***H04N 21/238*** | (2011.01) |
| ***H04N 21/258*** | (2011.01) |

(52) U.S. Cl.

CPC ................. *H04N 21/23805* (2013.01); *H04N 21/234381* (2013.01); *H04N 21/25816* (2013.01); *H04N 21/4384* (2013.01)

(58) Field of Classification Search

CPC ......... H04N 21/4384; H04N 21/23805; H04N 21/234381; H04N 21/25816

See application file for complete search history.

(56) References Cited

U.S. PATENT DOCUMENTS

| | | | |
|---|---|---|---|
| 5,757,414 | A | 5/1998 | Thorne |
| 7,643,731 | B2 | 1/2010 | Kobayashi et al. |
| 7,702,925 | B2 | 4/2010 | Northcutt et al. |
| 7,796,194 | B2 | 9/2010 | Hall |
| 7,893,941 | B2 | 2/2011 | Day et al. |
| 8,321,905 | B1 | 11/2012 | Streeter et al. |
| 9,456,236 | B2 | 9/2016 | Velasco et al. |
| 9,516,362 | B2 | 12/2016 | Velasco et al. |

(Continued)

*Primary Examiner* — Pinkal R Chokshi

(74) *Attorney, Agent, or Firm* — Crestron Electronics, Inc.

(57) ABSTRACT

Fast transitioning from delivering, to a sink, a first video signal outputted by a first source to delivering, to the sink, a second video signal outputted by a second source is carried out. A repeater, connected to the sink, receives the first video signal, and delivers same to the sink. The repeater terminates delivering the first video signal, begins authentication of the second source, and delivers a temporary video signal to the sink device so that the sink remains authenticated while the second source is being authenticated. The frame rate of the temporary signal is set to a minimum variable refresh rate (VRR) supported by the sink and is less than a frame rate of the first video signal. Upon completion of authentication of the second source device, delivery of the temporary video signal is discontinued, and the second video signal is received and delivered to the sink.

20 Claims, 17 Drawing Sheets

(56) References Cited

U.S. PATENT DOCUMENTS

| | | | |
|---|---|---|---|
| 9,609,037 | B2 | 3/2017 | Klein |
| 9,929,877 | B2 | 3/2018 | Velasco et al. |
| 9,984,664 | B2 | 5/2018 | Glen |
| 11,776,502 | B1 | 10/2023 | Waggoner |
| 2003/0212997 | A1 | 11/2003 | Hejna |
| 2004/0012600 | A1 | 1/2004 | Deering |
| 2006/0140211 | A1 | 6/2006 | Huang et al. |
| 2007/0064941 | A1 | 3/2007 | Unger |
| 2008/0127258 | A1 | 5/2008 | Walker |
| 2008/0138889 | A1 | 6/2008 | Muijen |
| 2008/0195744 | A1 | 8/2008 | Bowra |
| 2009/0138935 | A1 | 5/2009 | Ohkita |
| 2010/0138889 | A1 | 6/2010 | Subramanian et al. |
| 2011/0134330 | A1 | 6/2011 | Yu et al. |
| 2011/0150215 | A1 | 6/2011 | Domingo |
| 2011/0150216 | A1 | 6/2011 | Barry |
| 2011/0176056 | A1 | 7/2011 | Toba |
| 2011/0197073 | A1 | 8/2011 | Taraci |
| 2012/0147267 | A1 | 6/2012 | Ryan et al. |
| 2013/0103822 | A1 | 4/2013 | Wolcott et al. |
| 2013/0212613 | A1 | 8/2013 | Velasco |
| 2014/0153904 | A1 | 6/2014 | Adimatyam et al. |
| 2014/0232940 | A1 | 8/2014 | Nio |
| 2015/0020088 | A1 | 1/2015 | Velasco |
| 2017/0013294 | A1 | 1/2017 | Velasco et al. |
| 2017/0070761 | A1 | 3/2017 | Velasco et al. |
| 2019/0156785 | A1* | 5/2019 | Marchya .............. G09G 3/2096 |

* cited by examiner

FAST SWITCHING USING VARIABLE REFRESH RATE IN A REPEATER ENVIRONMENT

CROSS-REFERENCE TO RELATED APPLICATIONS

This application is a continuation of U.S. application Ser. No. 18/212,251, filed Jun. 21, 2023, the disclosure of which is incorporated herein by reference.

BACKGROUND OF THE INVENTION

Technical Field

The present embodiments relate to video distribution networks and, more particularly, to video distribution networks in which a repeater device or other device receives video signals from a video source device and delivers the video signals to a video sink device.

Background Art

Video distribution networks have become increasingly common in various commercial and residential environments. These video distribution networks typically receive video signals from one or more video sources and deliver video to one or more video sinks. For example, a typical home distribution network may include various sources such as the Internet, a streaming box, a gaming console, a Blu-Ray disc player, a media server, a digital video disc (DVD) player, a digital video recorder (DVR), a cable box, etc. Video from such video sources may be distributed using various repeater devices or network devices to deliver the video to one or more video sinks. Such video sinks may include a television display, a computer monitor, and/or a video projector.

To manage the transfer of video (and other content) over a video distribution network, a video input/output (I/O) interface standard is employed. These standards typically employ protocols to control the transfer of the video. Among such standards are the DisplayPort (DP), Digital Video Interface (DVI), and High-Definition Multimedia Interface (HDMI) standards.

To ensure that video and other content, such as television programs, movies, and music, can only be viewed or listened to by paying customers or other authorized parties, various digital rights management (DRM) schemes have been developed to protect digital content as it is transmitted over the video distribution network. One such DRM scheme is the High-Bandwidth Digital Content Protection (HDCP). HDCP is a specified method developed by Digital Content Protection, L.L.C. (DCP) for protecting copyrighted digital content as it travels across connection interfaces and other protocols such as DisplayPort (DP), Digital Video Interface (DVI), High-Definition Multimedia Interface (HDMI). The HDMI specification defines an interface for carrying digital audio-visual content from a source to a sink or other display device.

The HDCP includes an authentication protocol through which a source verifies that a given sink is authorized to receive HDCP-protected content. The HDCP authentication protocol is an exchange of information between a source and a sink through which the sink affirms to the source that it is authorized to receive HDCP-protected content. Specifically, each HDCP-compliant source, HDCP-compliant sink or other HDCP-compliant device stores a set of secret keys, also known as Device Private Keys, that are unique to that device and from which that device may generate a unique key selection vector (KSV). During authentication, a pair of HDCP-compliant devices, such as an HDCP-compliant source and an HDCP-compliant sink, exchange their unique KSVs which are then used by one of the devices to verify that the other device stores such a set of secret keys.

The exchange of information also enables both the HDCP-compliant source and the HDCP-compliant sink to generate a shared secret value that cannot be determined by eavesdropping on that information exchange. By having the shared secret value embedded into the demonstration of authentication, the shared secret value can then be used as a symmetric key by which an HDCP-compliant source may encrypt HDCP-protected content intended for only an authorized sink or other device. Thus, a communication path is established between the HDCP-compliant source and the HDCP-compliant sink that only such authenticated devices may access.

A more involved authentication process is required when HDCP-protected content is to be transmitted from an HDCP-compliant source to one or more HDCP-compliant sinks through a repeater. To authenticate these sinks to an HDCP-compliant source, an HDCP-compliant repeater must pass along the KSVs of each sink to the HDCP-compliant source. The HDCP-compliant source then checks each of their KSVs against an HDCP Revocation List maintained by DCP, LLC ("HDCP blacklist") to determine whether each sink is licensed to receive the HDCP-protected content. If each of these sinks is determined to be licensed to receive HDCP-protected content, the HDCP-compliant source may then transmit the HDCP-protected content to the repeater. The HDCP-compliant repeater must also establish and periodically manage authenticated links with each HDCP-compliant source and HDCP-compliant sink to which it is connected.

Though HDCP offers the benefit of encrypted content transmission, the required authentication protocol increases the switching delay in video distribution networks because every link in the transmission path, such as the repeaters or other network devices, must be authenticated. Moreover, whenever a new video distribution path is desired, the links forming the new path must likewise be authenticated. For example, when a user desires to switch from one video source to another, the new video source must carry out authentication with the repeater device, and because this authentication interrupts the delivery of video signals from the repeater to the sink, the repeater device must also re-authenticate with the sink. As a result of the various authentications carried out between each pair of devices in the transmission path, the time delay in response to switching from one source to another increases, which increases the time that delivery of video to the sink is disrupted. During such interruptions, a scrambled or "snowy" image of a blank screen may be displayed on the screen. The scrambled or "snowy" images resulting from such delays and interruptions may become bothersome to users.

Moreover, in a complex video distribution system with multiple layers, the length of such delays is amplified. Additionally, because the HDCP scheme operates under the surface, most users are not aware that these increased switching delays result from the copy protection schemes and often erroneously attribute the delays and disruptions to the individual components of the video distribution network.

To address the delay caused while switching video sources, a video protocol, the HDMI 2.1 specification, attempted to solve the problem by introducing quick media switching (QMS). Quick media switching relies on using a variable refresh rate (VRR) to eliminate the blackout period when an HDMI source device switches video modes. In theory, QMS allows the source to change frame rates continuously and seamlessly in the video delivered to a television or other video sink. As long as the resolution remains the same and only the frame rate changes, QMS will seamlessly switch between frame rates.

The QMS technology has the drawback that it requires the source to always output video at the same resolution and color space and can only handle changes in the frame rate. Further, the source must change frame rates in a specific manner with specified tolerances on the rate of change and with a continuity requirement, namely, the video signal delivered to the sink must be always present and never lost. In a real-world environments, however, users may switch between many diverse sources (such as a streaming box, a Blu-ray player, a gaming console, etc.) that have different resolutions, different color spaces, and/or different frame rates. If the resolution or color space changes when the user switches between sources, the QMS feature does not compensate for such changes.

Additionally, in scenarios where a repeater is used, such as when a switcher or multiplexer controls the switchover from one source to another source, the QMS feature likewise does not work because as the repeater changes between different inputs, the switching of inputs causes interruptions in, and temporary loss of, the video signal delivered to the TV. The temporary interruptions in the video signal causes the TV and the repeater to have to renegotiate the HDCP authentication, video timing, training, etc., between the repeater and the sink, extending the time that the end user must wait until content from the new source is viewed.

An additional cause of high switching delays in video distribution systems is the need for image processing within the video distribution network. As an example, scalers are often employed to convert a lower resolution video signal to a higher resolution video signal, known as "up-conversion" or "upscaling", or to convert a higher resolution video signal to a lower resolution video signal, known as "down-conversion" or "downscaling". Scalers are also often employed to change the refresh rate of distributed video. Such scalers are common components in video distribution networks, either as separate components or integrated within the network.

Such scalers, however, have the further drawback that they require a constant frame rate even when the content changes video frame rates, such as a change between television content (with its 60 Hz frame rate) and film content (with its 24 Hz frame rate). Whenever a video scaler receives a new video signal containing audiovisual data having a new resolution, a delay occurs until the scaler outputs the new video. That is, the video scaler must load the data and format it before outputting the scaled video. This process is known as achieving video lock. During a switching event, each scaler in the distribution path must achieve video lock in succession. Again, in a complex video distribution system with multiple layers, this delay is magnified. Thus, even when scalers are used, a transition from one video source to another having a different frame rate still results in a disruption in the video delivered to the television or other video sink.

In a known attempt to address this disruption in the video signal delivered to the sink, the output scaler may be configured to generate a repeating frame of the image data received from the former video source at the frame rate of that video source. The repeating frame of image content data is generated until the video lock is achieved. By repeating the same frame of video, the user is presented a cleaner and more aesthetically pleasing switchover in which a momentarily frozen screen is displayed. Upon achieving video lock with the incoming video after the switching discontinuity, the output scaler then "unfreezes" the video by ceasing output of the repeating frame and begins to output live scaled video. Such an implementation is described in U.S. Pat. No. 9,425,236, issued Sep. 27, 2016, to Velasco et al, the disclosure of which is incorporated herein by reference.

This freezing of the video screen, however, is sometimes noticeable by the end user. Moreover, when the video is "unfrozen" at the time video lock is achieved, the sudden transition from the frame rate of the former video signal to the frame rate of the new video signal is often noticeable and may be distracting to the viewer. For example, when the content changes video frame rates, such as the change from television content (with its 60 Hz frame rate) to film content (with its 24 Hz frame rate) described above, the scaler continues to output video at the 60 Hz frame rate and converts the 24 Hz frame rate video signal to a 60 Hz signal. This conversion generates motion artifacts, known as "skip and repeat", which is often noticeable to the user.

Also, in addition to generating motion artifacts, the frame rate conversion introduces a 1 or 2 frame delay in the signal, known as latency, which may be noticeable to the user. This latency may be present even when the new signal inputted to the scaler has the same frame rate as the prior signal delivered to the scaler because the new input signal is not synchronized to the prior signal. For example, the timing at which the new signal contains the beginning of a frame may coincide with a timing when the prior signal is part way through a frame. As a result, a delay is introduced in the output of the scaler when the scaler switches from receiving the prior signal to receiving the new signal. Though it is possible to have the timing of the video signal of the new source synchronized to the timing of the video signal of the prior source using generator locking, also known as genlocking, the use of such genlocking is generally limited to professional environments.

It is therefore desirable to provide a video distribution network in which switching from one video source to another is carried out in a quicker and less disruptive manner. It is also desirable provide a video distribution network in which the switching from one video source to another is carried out cleanly and seamlessly without introducing any latency or motion artifacts into the signal delivered to the user. It is further desirable to provide a video distribution network in which the sink remains authenticated and video locked while such switching is carried out.

SUMMARY OF THE INVENTION

It is to be understood that both the general and detailed descriptions that follow are exemplary and explanatory only and are not restrictive.

DISCLOSURE OF INVENTION

In accordance with an aspect, a system for switching from delivering a first video signal to a sink device to delivering a second video signal to the sink device comprises: (a) a repeater device connected to the sink device, the sink device being previously authenticated, the repeater device being further configured to (1) receive the first video signal outputted by a first source device, the first source device being previously authenticated, and deliver the first video signal to the sink device, (2) receive a command to switch from receiving the first video signal to receiving the second video signal, the second video signal being outputted by a second source device, (3) terminate receiving the first video signal, (4) deliver a temporary video signal to the sink device so that the sink device remains authenticated while the second source device is being authenticated, the repeater device setting the frame rate of the temporary video signal to a minimum variable refresh rate (VRR) supported by the sink device, and (5) receive the second video signal upon completion of authentication of the second source device, and deliver the second video signal to the sink device.

According to a further aspect, in a repeater device, a method of switching from delivering a first video signal to a sink device to delivering a second video signal to the sink device comprises: (a) receiving the first video signal outputted by a first source device, the first source device being previously authenticated; (b) delivering the first video signal to the sink device, the sink device being previously authenticated; (c) receiving a command to switch from receiving the first video signal to receiving the second video signal, the second video signal being outputted by a second source device; (d) terminating the receiving of the first video signal; (e) delivering a temporary video signal to the sink device so that the sink device remains authenticated while the second source device is being authenticated, the frame rate of the temporary video signal being set to a minimum variable refresh rate (VRR) supported by the sink device; (f) receiving the second video signal from the second source device upon completion of authentication of the second source device; and (g) delivering the second video signal to the sink device.

According to another aspect, a video distribution network, comprises: (a) a first source device configured to output a first video signal; (b) a second source device configured to output a second video signal; (c) a sink device; and (d) a repeater device connected to the sink device, the sink device being previously authenticated, the repeater device being further configured to (1) receive the first video signal outputted by the first source device, the first source device being previously authenticated, and deliver the first video signal to the sink device, (2) receive a command to switch from receiving the first video signal to receiving the second video signal, (3) terminate receiving the first video signal, (4) deliver a temporary video signal to the sink device so that the sink device remains authenticated while the second source device is being authenticated, the repeater device setting the frame rate of the temporary video signal to a minimum variable refresh rate (VRR) supported by the sink device, and (5) receive the second video signal upon completion of authentication of the second source device, and deliver the second video signal to the sink device.

According to yet another aspect, a system for switching from delivering a first video signal to a sink device to delivering a second video signal to the sink device, comprises: (a) a repeater device connected to the sink device, the sink device being previously authenticated in accordance with a High-Bandwidth Digital Content Protection (HDCP) authentication protocol, the repeater device being further configured to (1) read Extended Display Identification Data (EDID) from the sink device to obtain the minimum variable refresh rate (VRR) supported by the sink device, (2) receive the first video signal outputted by a first source device, the first source device being previously authenticated in accordance with the HDCP authentication protocol, and deliver the first video signal to the sink device, the first video signal having a first frame rate, (3) receive a command to switch from receiving the first video signal to receiving the second video signal, the second video signal being outputted by a second source device, (4) terminate receiving the first video signal, (5) deliver a temporary video signal to the sink device so that the sink device remains authenticated while the second source device is being authenticated in accordance with the HDCP authentication protocol, the repeater device setting the frame rate of the temporary video signal to the minimum variable refresh rate (VRR) supported by the sink device, the temporary video signal including a repeating frame of video signal delivered at the minimum variable refresh rate (VRR) supported by the sink device, the repeating frame of video signal being one of (A) a last received frame of the first video signal, or (B) a blank frame of video signal, and (6) receive the second video signal upon completion of authentication of the second source device, and deliver the second video signal to the sink device, the second video signal having a second frame rate different than the first frame rate.

According to still another aspect, a system for switching from delivering a first video signal to a sink device to delivering a second video signal to the sink device, comprises: (a) a repeater device connected to the sink device, the sink device being previously authenticated in accordance with a High-Bandwidth Digital Content Protection (HDCP) authentication protocol, the repeater device being further configured to (1) read Extended Display Identification Data (EDID) from the sink device to obtain the minimum variable refresh rate (VRR) supported by the sink device, (2) receive the first video signal outputted by a first source device, the first source device being previously authenticated in accordance with the HDCP authentication protocol, and deliver the first video signal to the sink device, the first video signal having a first frame rate, (3) receive a command to switch from receiving the first video signal to receiving the second video signal, the second video signal being outputted by a second source device, the first video signal and the second video signal not being synchronized, (4) terminate receiving the first video signal, (5) deliver a temporary video signal to the sink device so that the sink device remains authenticated while the second source device is being authenticated in accordance with the HDCP authentication protocol, the repeater device setting the frame rate of the temporary video signal to the minimum variable refresh rate (VRR) supported by the sink device, the temporary video signal including a repeating frame of video signal delivered at the minimum variable refresh rate (VRR) supported by the sink device, the repeating frame of video signal being one of (A) a last received frame of the first video signal, or (B) a blank frame or black frame of video signal, (6) receive the second video signal upon completion of authentication of the second source device, (7) transition from a timing of the first video signal to a timing of the second video signal according to the variable refresh rate (VRR) upon the completion of the authentication of the second source device, and (8) deliver the second video signal to the sink device.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

BRIEF DESCRIPTION OF THE SEVERAL VIEWS OF THE DRAWING

Figure 1A:
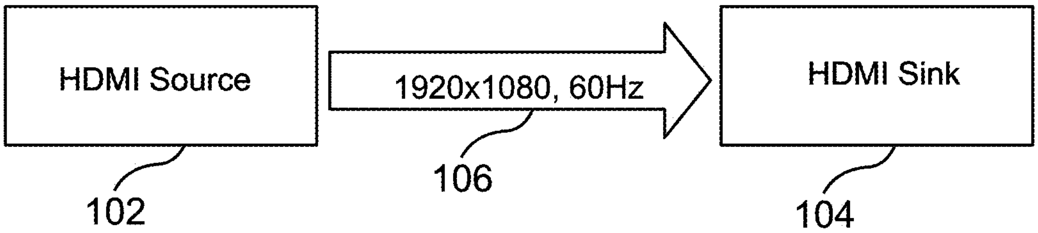
Figure 1B:
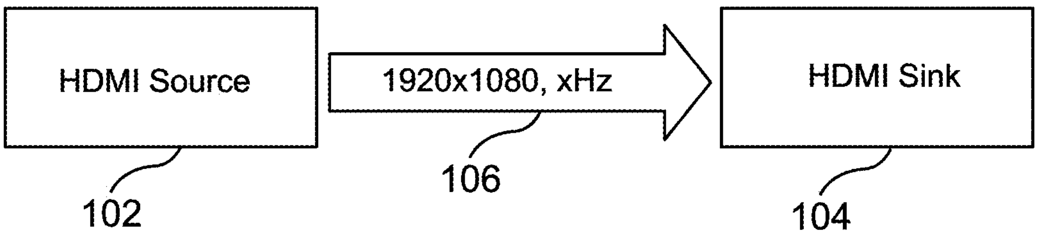
Figure 1C:
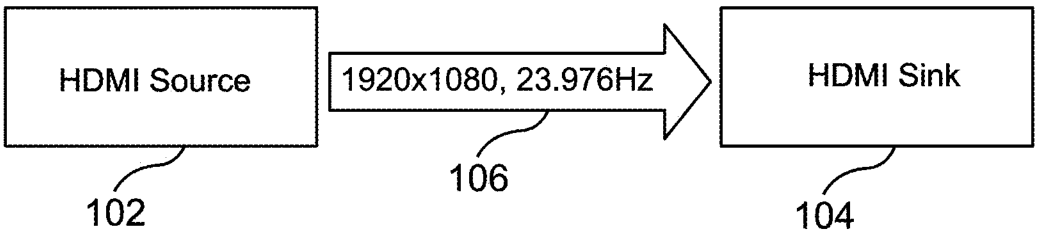

FIGS. 1A-1C are block diagrams showing a known switching operation.

Figure 2A:
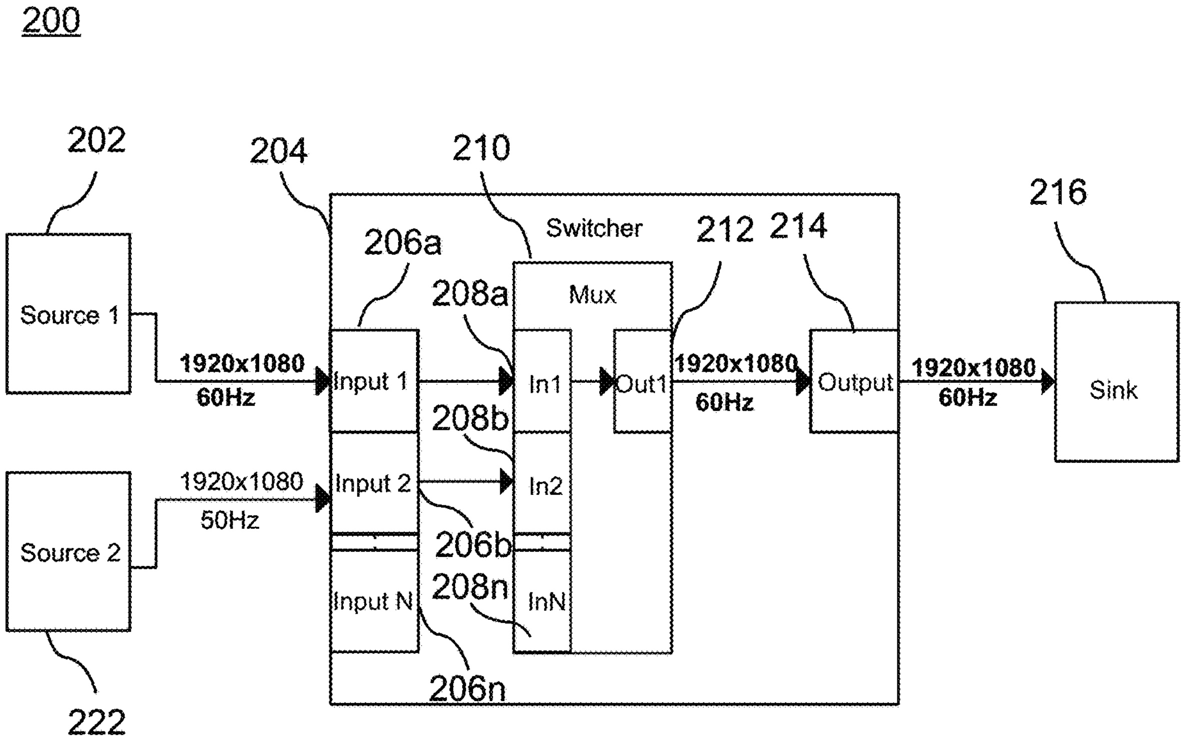
Figure 2B:
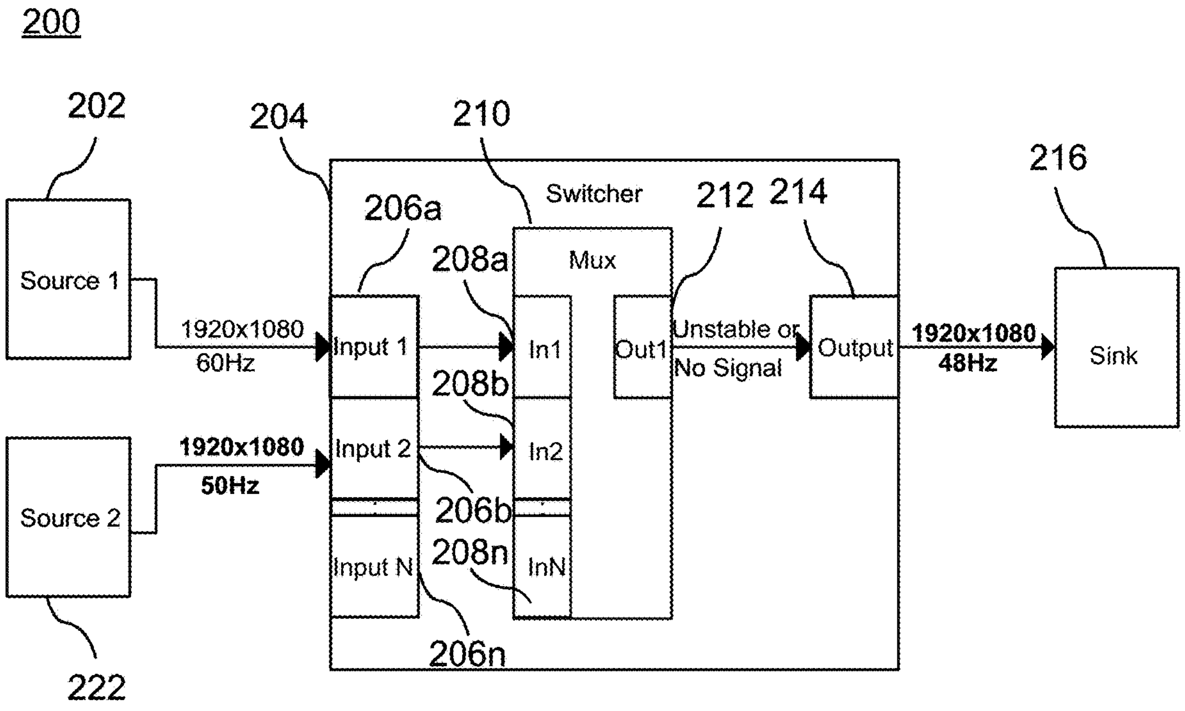
Figure 2C:
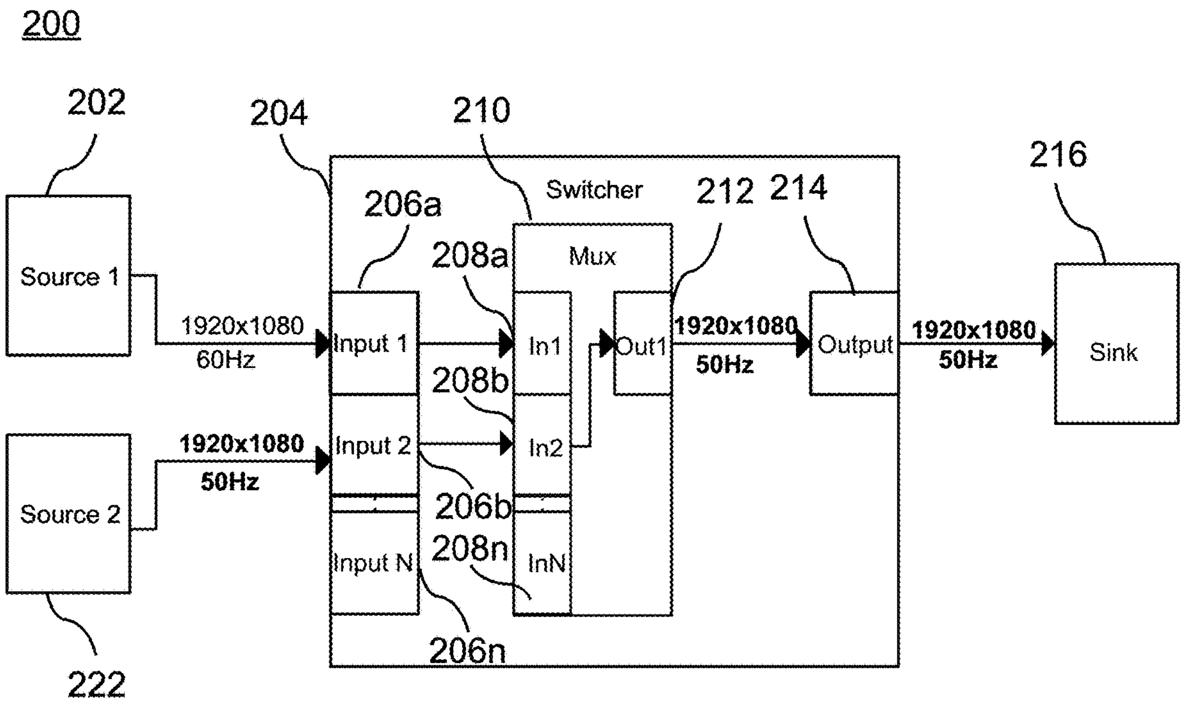

FIGS. 2A-2C are block diagrams showing a multiplexer system and fast switching by the multiplexer system in accordance with an embodiment.

Figure 3:
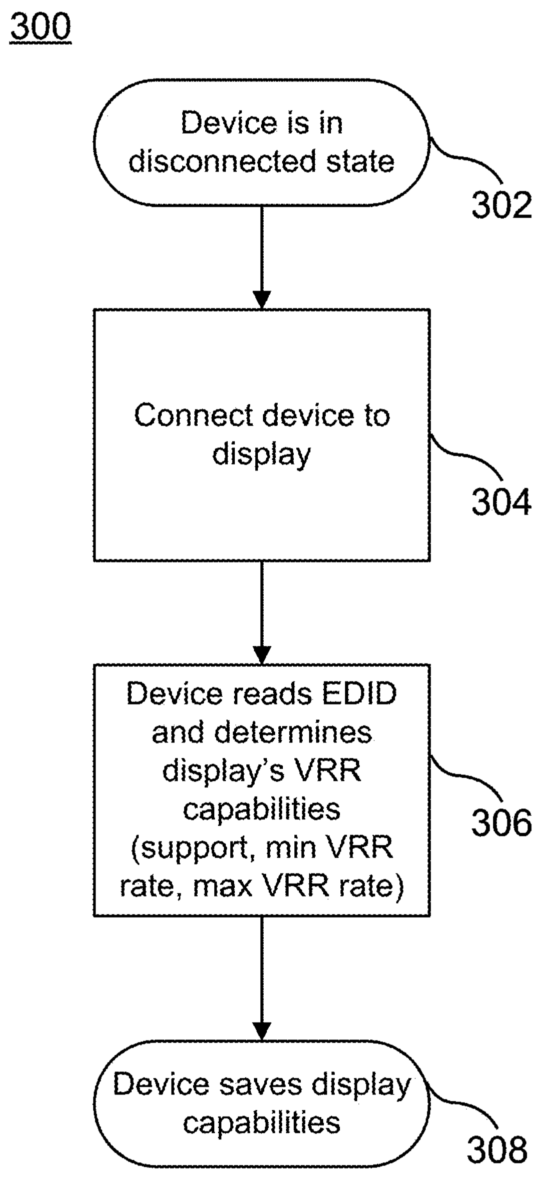

FIG. 3 is a flow chart of the steps performed in reading the capabilities of a sink device in accordance with an embodiment.

Figure 4A:
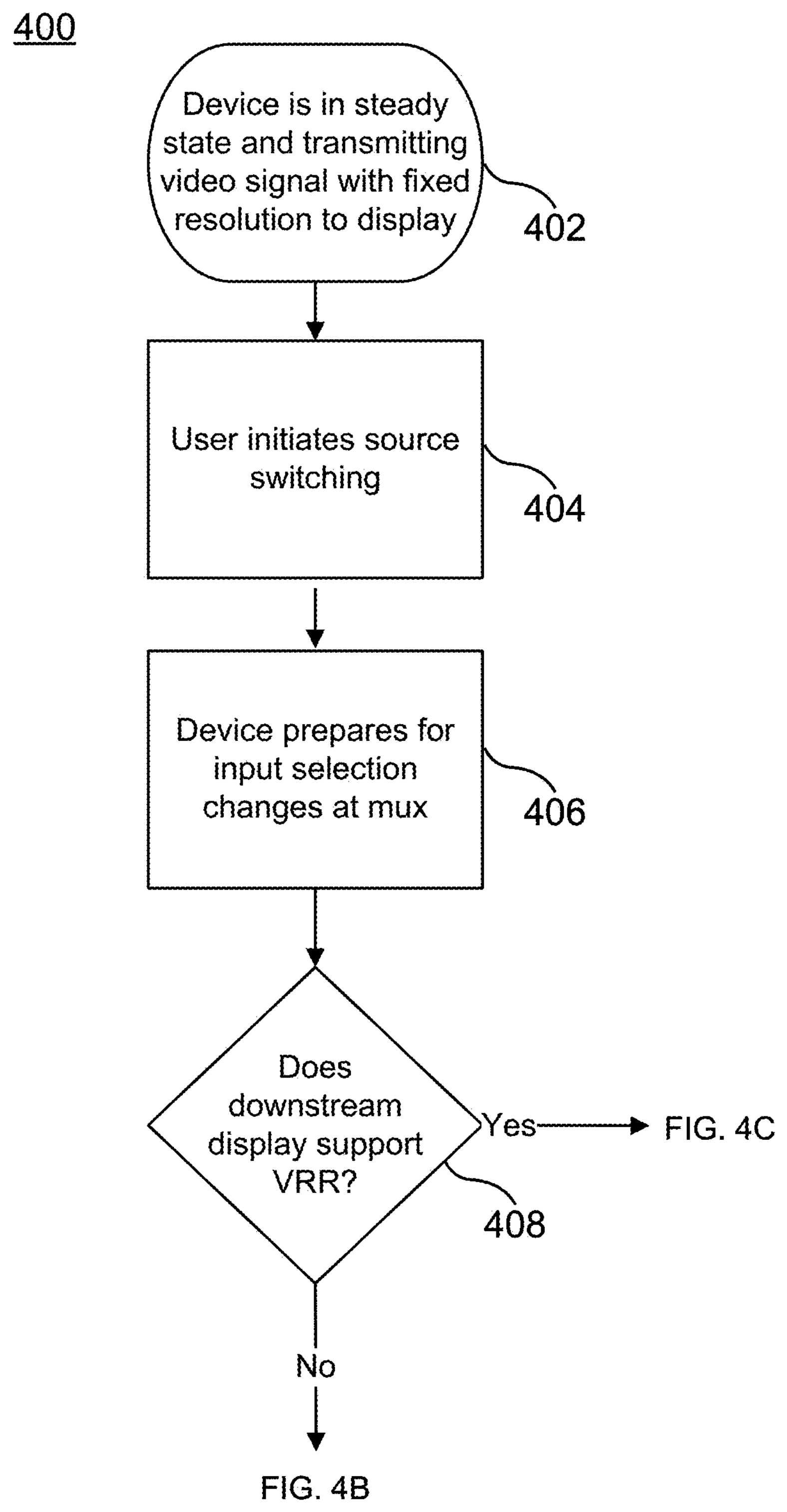
Figure 4B:
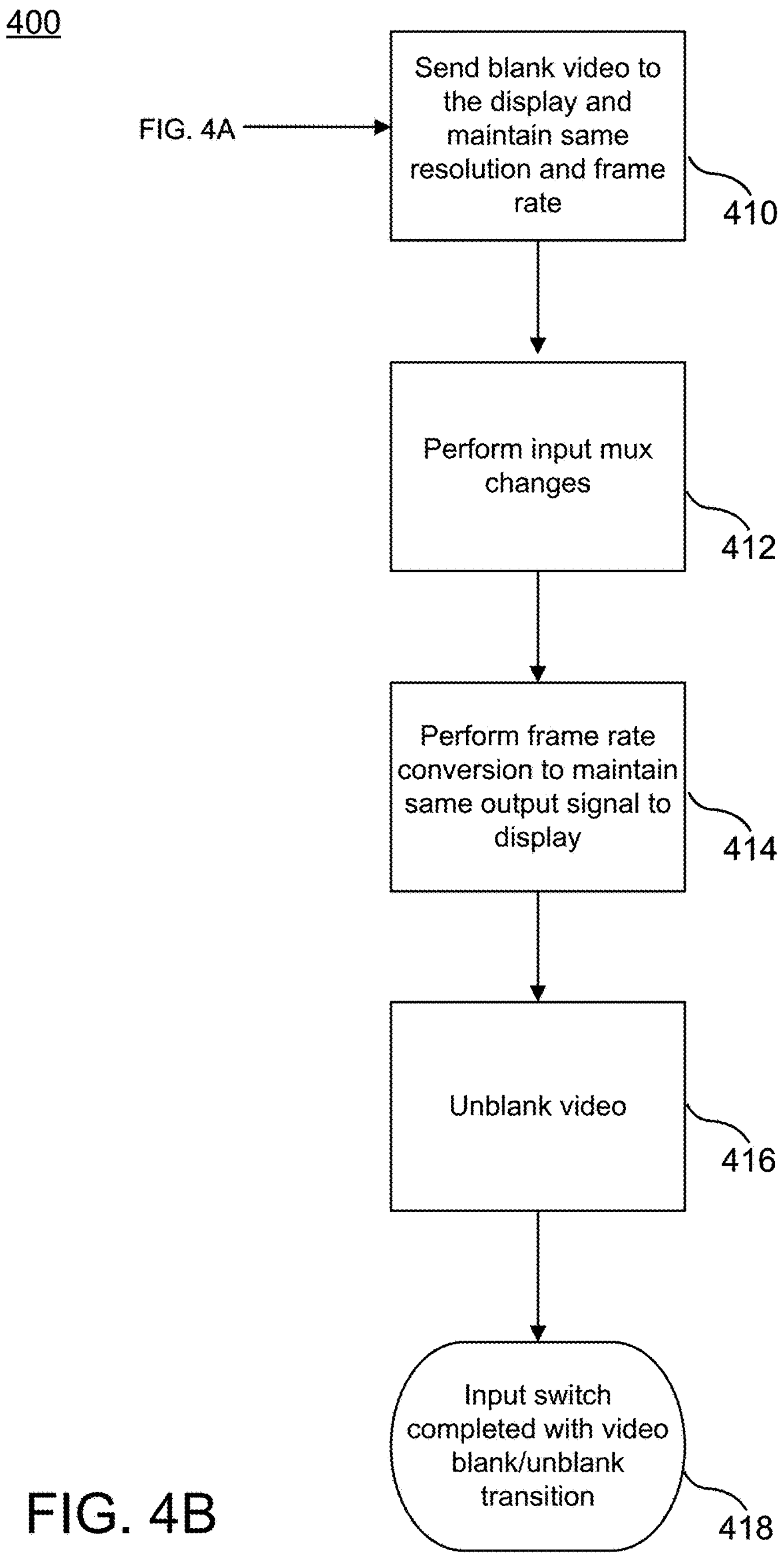
Figure 4C:
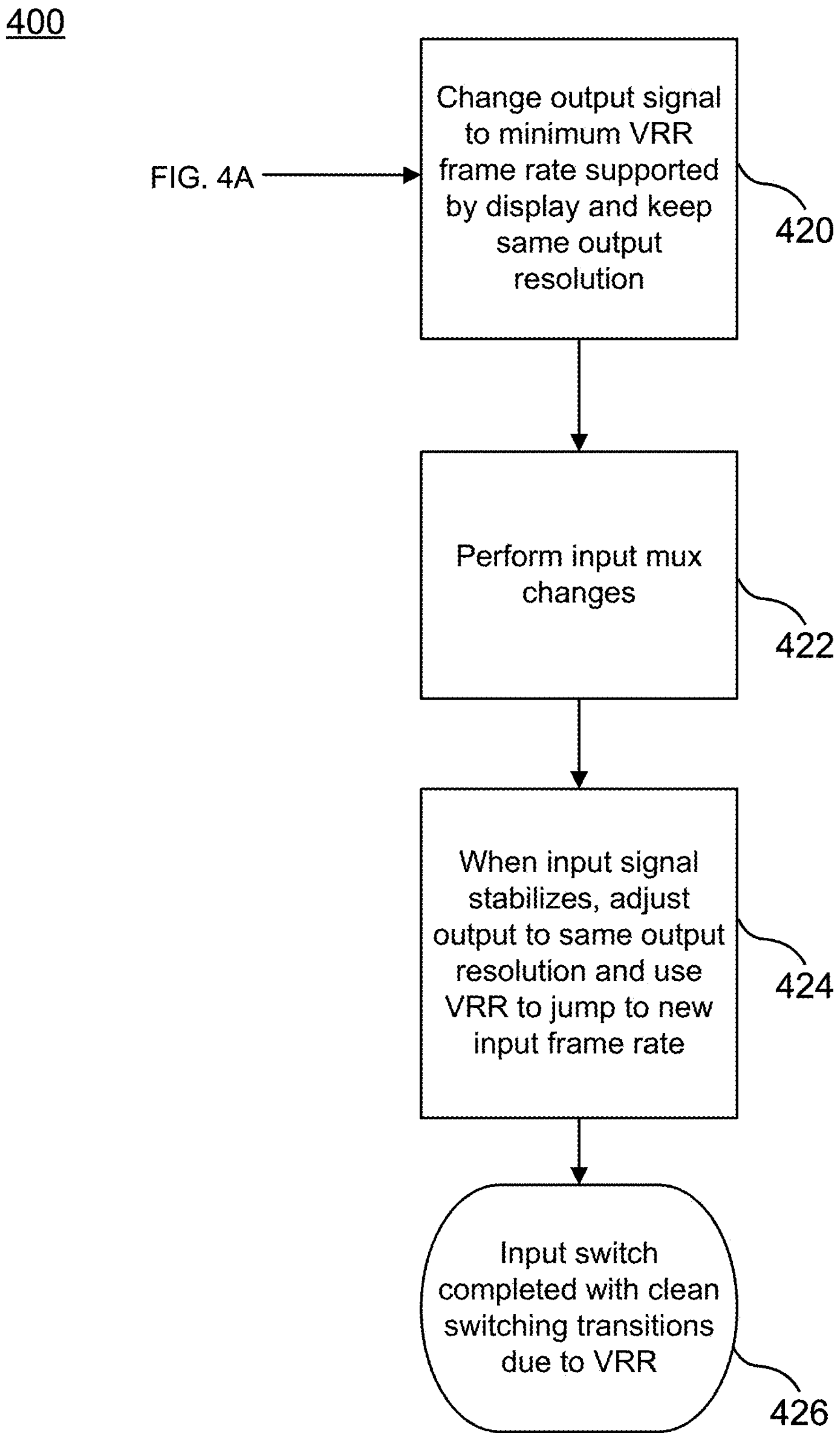

FIGS. 4A-4C is a flow chart of the steps performed during a fast-switching operation in accordance with an embodiment.

Figure 5A:
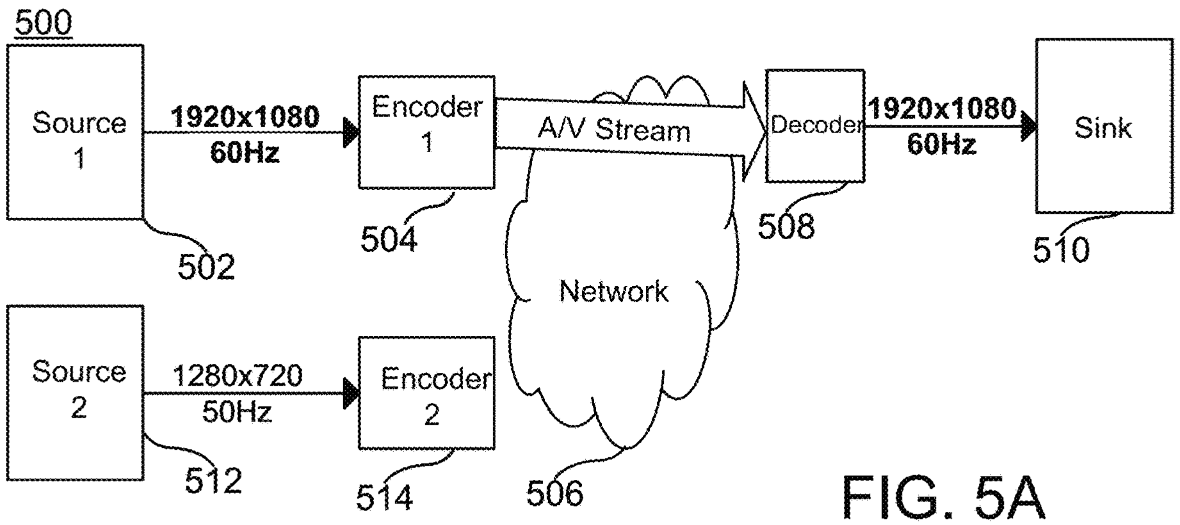
Figure 5B:
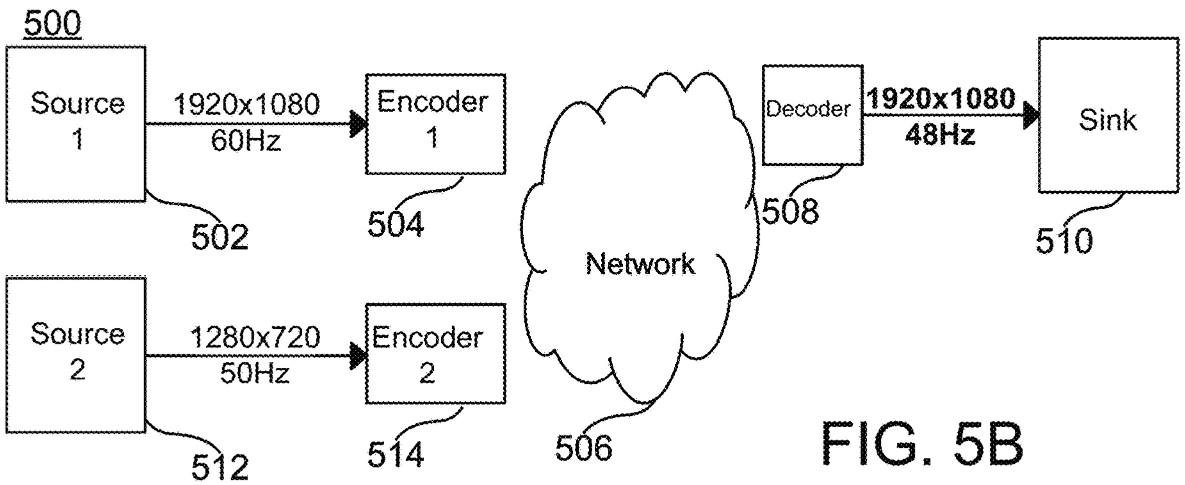
Figure 5C:
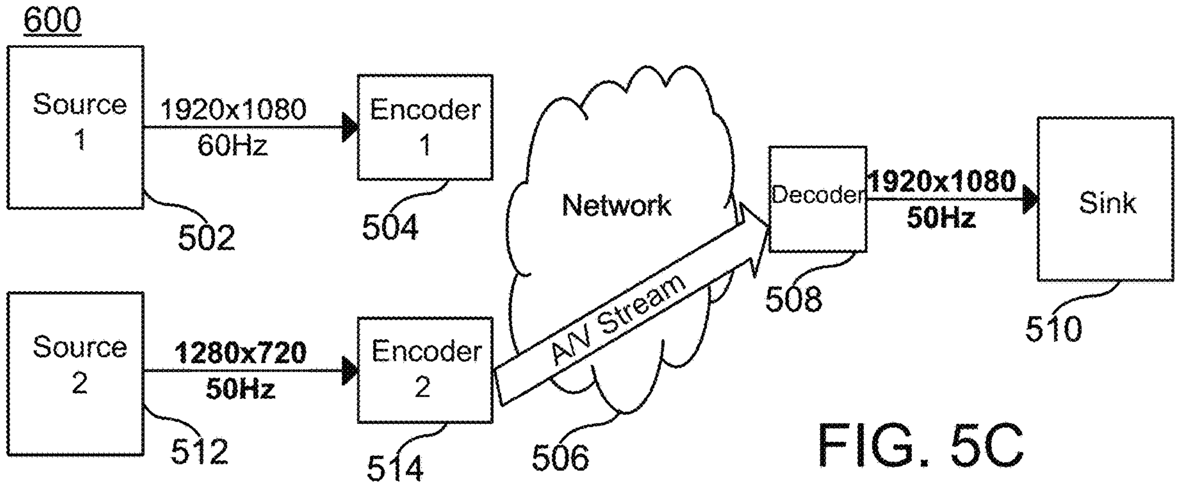

FIGS. 5A-5C are block diagrams showing fast switching carried out by a stream switch in accordance with an embodiment.

Figure 6:
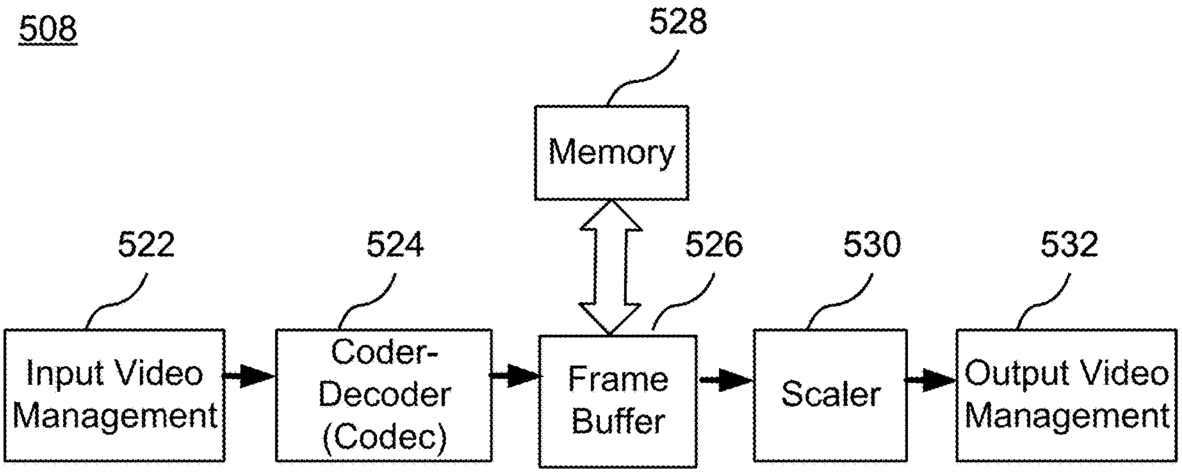

FIG. 6 is a block diagram showing functions of the decoder of FIGS. 5A-5C.

Figure 7:
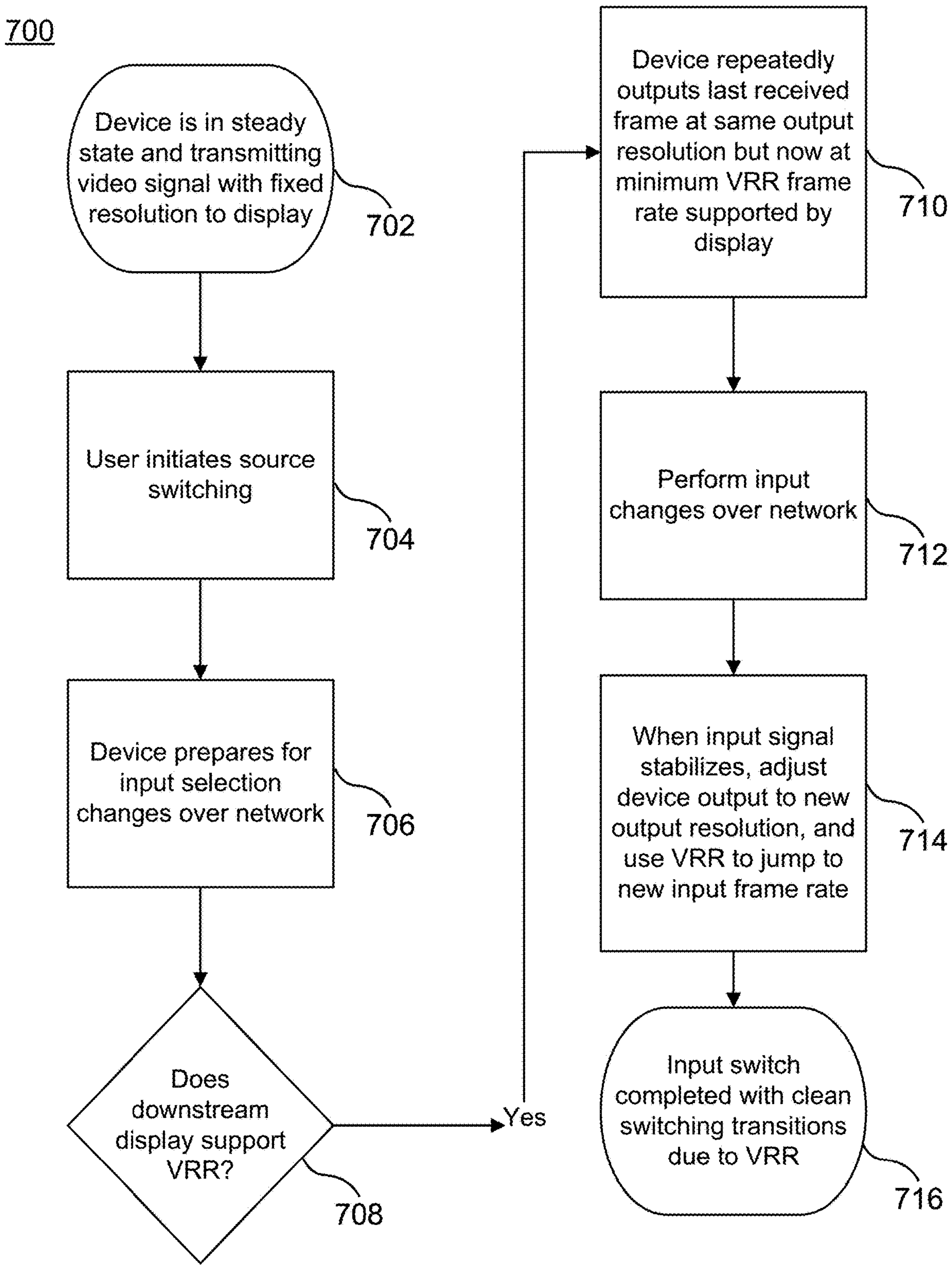

FIG. 7 is a flow chart of the steps performed during the fast-switching carried out by the embodiment of FIGS. 5A-5C.

Figure 8A:
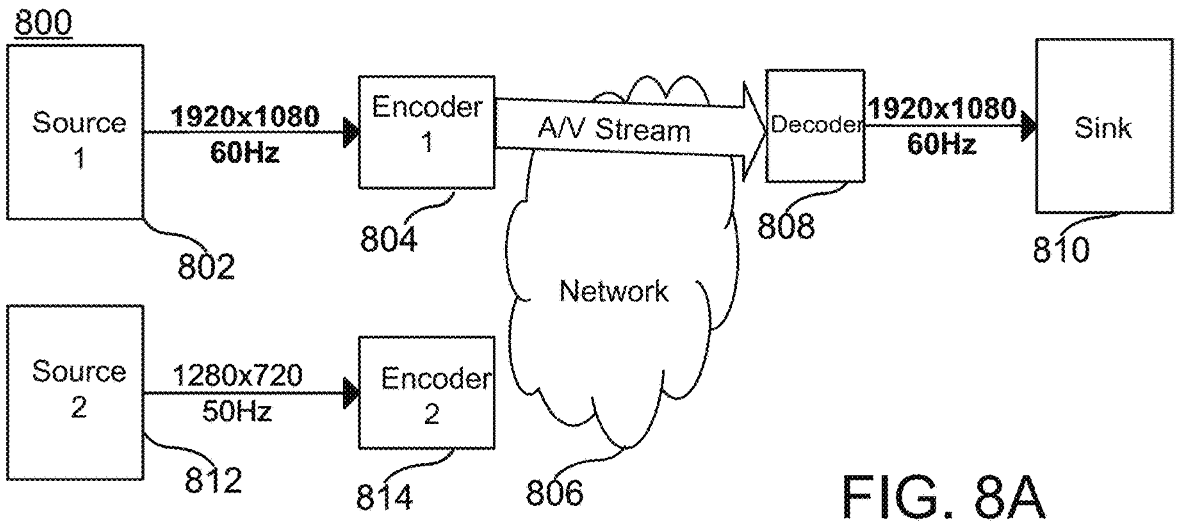
Figure 8B:
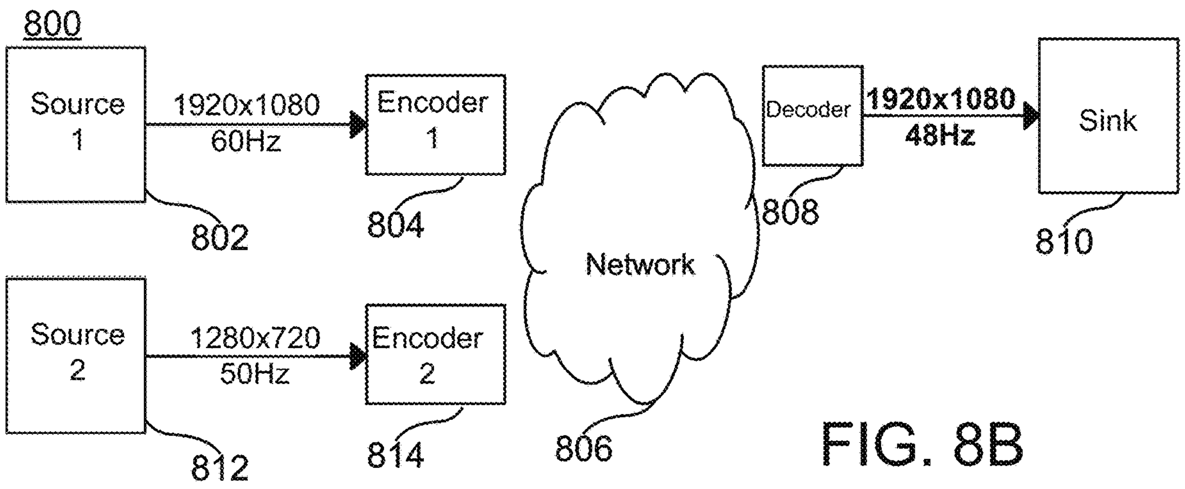
Figure 8C:
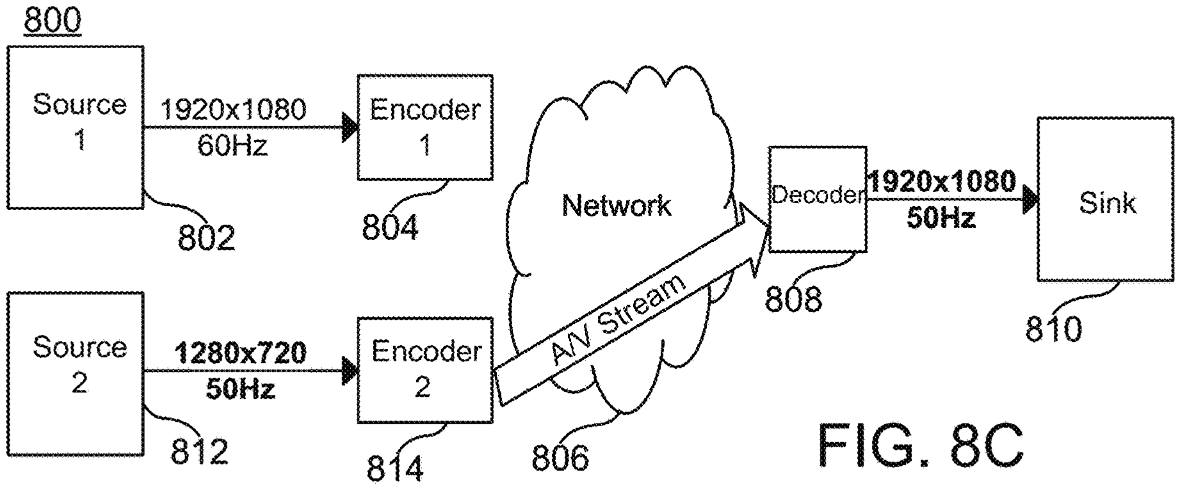

FIGS. 8A-8C are block diagrams showing fast switching carried out by a stream switch in accordance with another embodiment.

Figure 9:
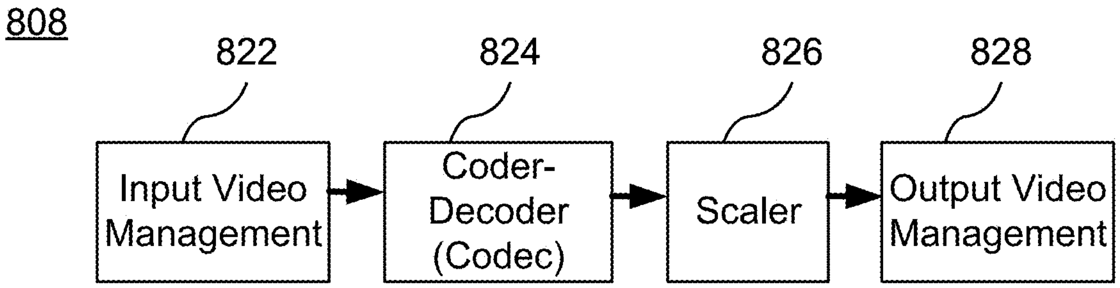

FIG. 9 is a block diagram showing functions of the decoder of FIGS. 8A-8C.

Figure 10:
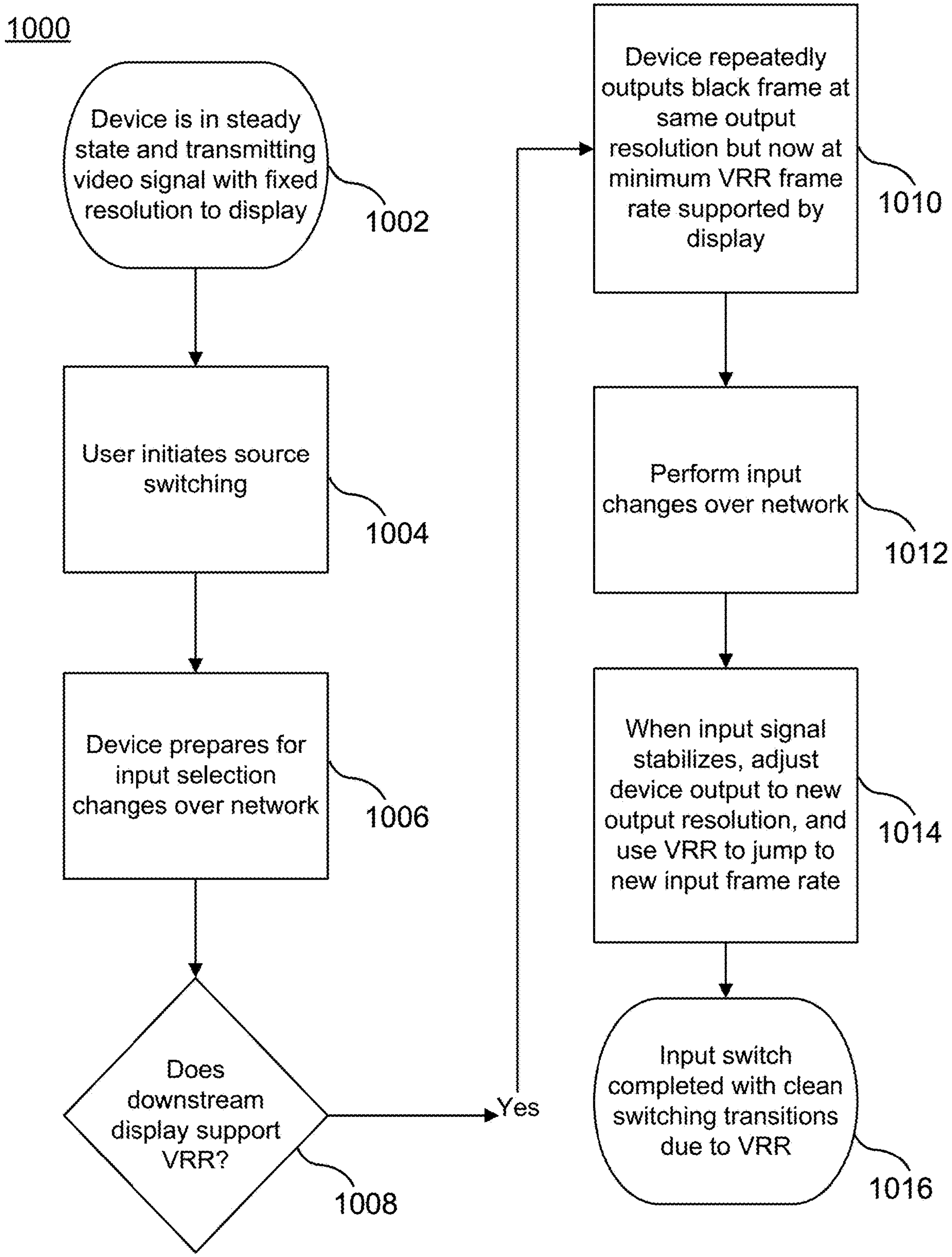

FIG. 10 is a flow chart of the steps performed during the fast-switching carried out by the embodiment of FIGS. 8A-8C.

Figure 11A:
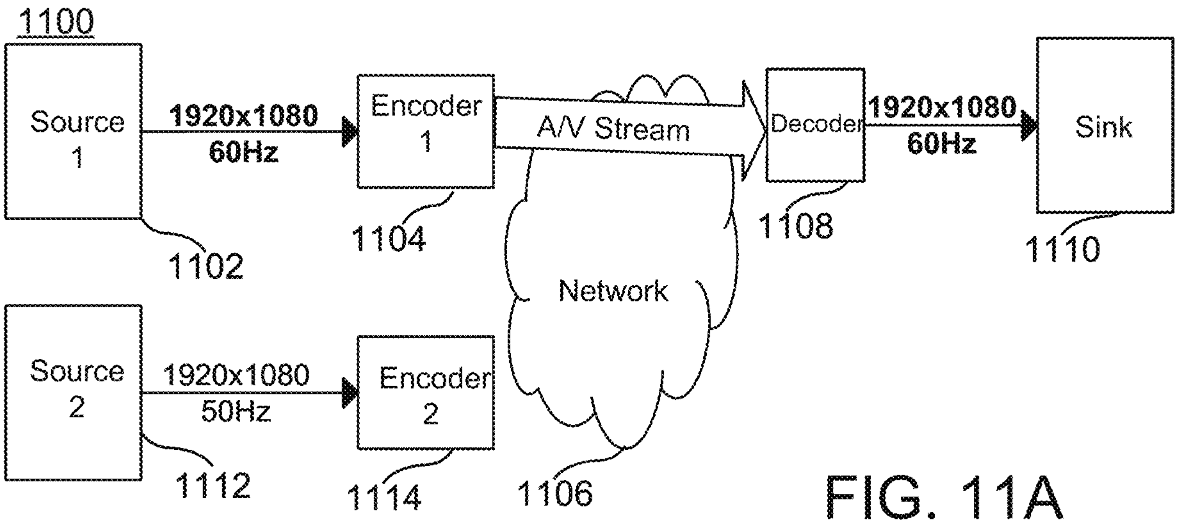
Figure 11B:
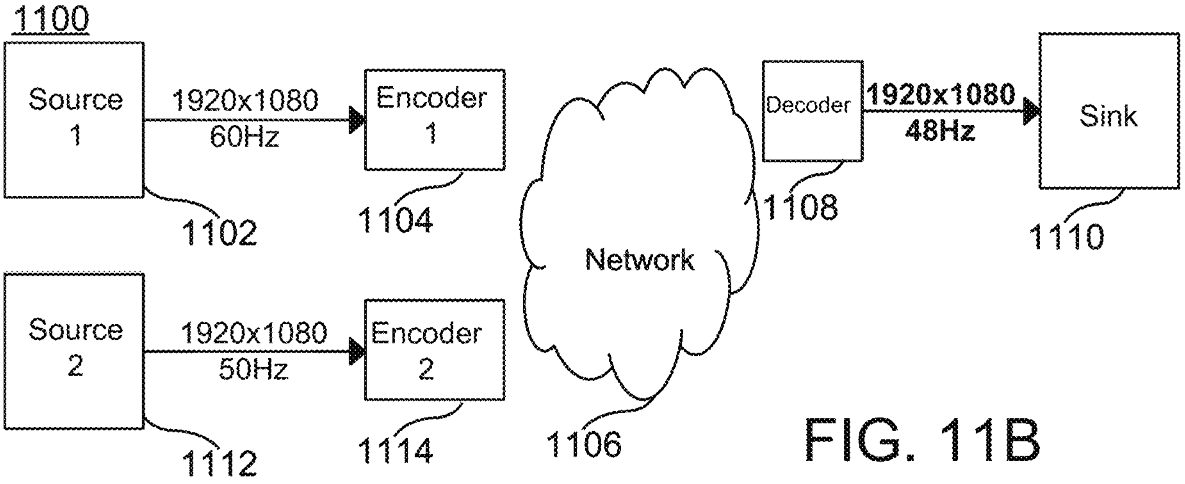
Figure 11C:
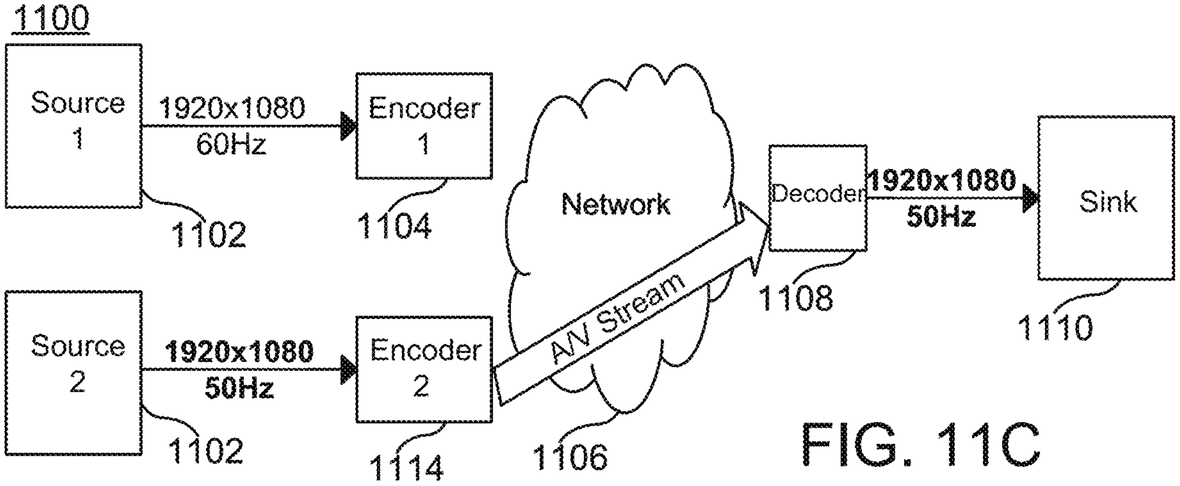

FIGS. 11A-11C are block diagrams showing fast switching carried out by a stream switch in accordance with yet another embodiment.

Figure 12:
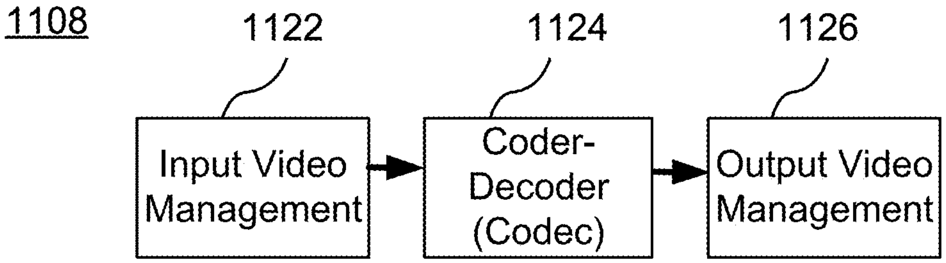

FIG. 12 is a block diagram showing functions of the decoder of FIGS. 11A-11C.

Figure 13:
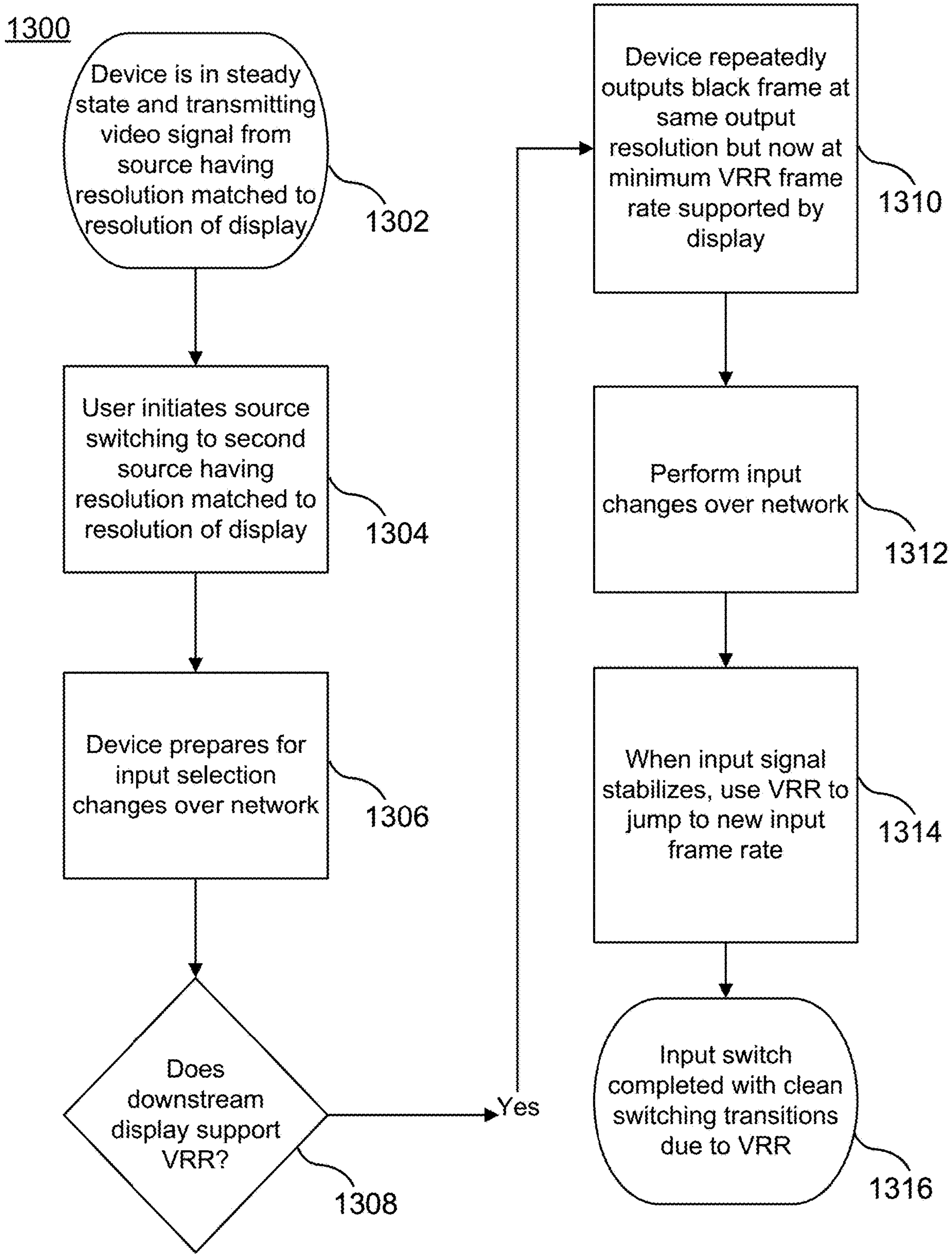

FIG. 13 is a flow chart of the steps performed during the fast-switching carried out by the embodiment of FIGS. 11A-11C.

DETAILED DESCRIPTION OF THE INVENTION

The present embodiments provide a video distribution network in which switching from one video source to another video source is carried out with a smooth transition in the video that is delivered to a television or other video sink.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”.

LIST OF REFERENCE NUMBERS FOR THE MAJOR ELEMENTS IN THE DRAWING

The following is a list of the major elements in the drawings in numerical order.

| | |
|---|---|
| 100 | Known Switching System |
| 102 | HDMI Source |
| 104 | HDMI Sink |
| 106 | Video Signal |
| 200 | Video Distribution Network |
| 202 | Source1 |
| 204 | Switcher |

-continued

| | |
|---|---|
| 206a | Switcher Input1 |
| 206b | Switcher Input2 |
| 206n | Switcher InputN |
| 208a | Mux Input In1 |
| 208b | Mux Input In2 |
| 208n | Mux Input InN |
| 210 | Mux |
| 212 | Mux Output Out1 |
| 214 | Switcher Output |
| 216 | Sink |
| 222 | Source2 |
| 300 | Reading Capabilities Steps |
| 302 | Device Disconnected Step |
| 304 | Connect Device Step |
| 306 | Read EDID Step |
| 308 | Save Step |
| 400 | Fast Switching Steps |
| 402 | System In Steady State |
| 404 | Initiate Source Switching Step |
| 406 | Prepare For Input Change Step |
| 408 | Display Supports VRR? |
| 410 | Blank Display Step |
| 412 | Change Input Step |
| 414 | Convert Frame Rate Step |
| 416 | Unblank Video Step |
| 418 | Switching Completed |
| 420 | Change to Minimum Supported VRR Step |
| 422 | Change Input Step |
| 424 | Adjust Output Resolution Step |
| 426 | Switching Completed Step |
| 500 | Video Distribution Network |
| 502 | Source1 |
| 504 | Encoder 1 |
| 506 | Network |
| 508 | Decoder |
| 510 | Sink |
| 512 | Source2 |
| 514 | Encoder 2 |
| 522 | Input Video Management |
| 524 | Coder-Decoder (Codec) |
| 526 | Frame Buffer |
| 528 | Memory |
| 530 | Scaler |
| 532 | Output Video Management |
| 700 | Fast Switching Steps |
| 702 | System In Steady State |
| 704 | Initiate Source Switching Step |
| 706 | Prepare For Input Change |
| 708 | Display Supports VRR? |
| 710 | Change to Minimum Supported VRR Step |
| 712 | Change Input Step |
| 714 | Adjust Output Step |
| 716 | Switching Completed |
| 800 | Video Distribution Network |
| 802 | Source1 |
| 804 | Encoder 1 |
| 806 | Network |
| 808 | Decoder |
| 810 | Sink |
| 812 | Source2 |
| 814 | Encoder 2 |
| 822 | Input Video Management |
| 824 | Coder-Decoder (Codec) |
| 826 | Scaler |
| 828 | Output Video Management |
| 1000 | Fast Switching Steps |
| 1002 | System In Steady State |
| 1004 | Initiate Source Switching Step |
| 1006 | Prepare For Input Change |
| 1008 | Display Supports VRR? |
| 1010 | Change to Minimum Supported VRR Step |
| 1012 | Change Input Step |
| 1014 | Adjust Output Resolution Step |
| 1016 | Switching Completed Step |
| 1100 | Video Distribution Network |
| 1102 | Source1 |
| 1104 | Encoder 1 |
| 1106 | Network |
| 1108 | Decoder |

-continued

| | |
|---|---|
| 1110 | Sink |
| 1112 | Source2 |
| 1114 | Encoder 2 |
| 1122 | Input Video Management |
| 1124 | Coder-Decoder (Codec) |
| 1126 | Output Video Management |
| 1300 | Fast Switching Steps |
| 1302 | System In Steady State |
| 1304 | Initiate Source Switching Step |
| 1306 | Prepare For Input Change |
| 1308 | Display Supports VRR? |
| 1310 | Change to Minimum Supported VRR Step |
| 1312 | Change Input Step |
| 1314 | Adjust Output Step |
| 1316 | Switching Completed |

MODE(S) FOR CARRYING OUT THE INVENTION

The embodiments described herein are in the context of a video distribution network, but are not limited thereto, except as may be set forth expressly in the appended claims.

FIGS. 1A-1C show a known switching operation carried out in accordance with the HDMI 2.1 specification.

Referring first to FIG. 1A, the system in initially in a steady state in which a video signal 106 having a first pixel resolution and frame rate, such as a video signal having a 1920×1080 pixel resolution and 60 Hz frame rate, is transmitted from a source 102 to a sink 104.

Then, as FIG. 1B shows, the frame rate of the video signal delivered by the source 102 is changed to another frame rate, such as to 23.976 Hz. Alternatively, another video source delivers a new video signal at the another frame rate. In theory, the QMS technology employed by the HDMI 2.1 specification provides for a transition of the video signal 106 to the new frame rate over an interval of several video frames. During this interval, no video signal is delivered to the sink 104, resulting in a blank screen being displayed.

Then, as FIG. 1C shows, a video lock is achieved and a video signal 106 is now delivered at the new frame rate, e.g., 23.976 Hz, to the sink 104.

The QMS technology, however, only works for changes in frame rates that occur while the same resolution and color space is maintained. The QMS technology is not capable of handling most real-world changes in frame rates where a repeater is used to switch from one source to another. Moreover, the QMS technology is not capable of handling switches between sources having different resolutions and/or different color spaces.

FIGS. 2A-2C show a video distribution network 200 in accordance with an embodiment. The video distribution network 200 employs a switcher 204 as a repeater. The switcher 202 includes a multiplexer system (Mux) 210 as well as a plurality of switcher inputs, namely, Input1 206*a*, Input2 206*b*, . . . , InputN 206*n*. Each of the plurality of switcher inputs receives a video signal from an associated source, when connected, and delivers the received video signal to a corresponding input on the Mux 210. As an example, in FIGS. 2A-2C, Input1 206*a* receives a video signal from Source1 202 and delivers a video signal to Mux input In1 208*a*, and Input2 206*b* receives a video signal from Source2 222 and delivers a video signal to Mux input In2 208*b*.

The Mux 210, among other functions, connects one of the Mux inputs In1 208*a*, In2 208*b*, . . . , InN 208*n* to a single output Out1 212 so that the video signal received from that Mux input is delivered to the output Out1 212. The video signal received by the Mux output Out1 212 is then delivered to switcher Output 214 which, in turn, is delivered to Sink 216.

FIG. 2A shows the video distribution network 200 in its initial steady state. A first video signal having, for example, a 1920×1080 resolution at a 60 Hz frame rate is outputted by Source1 202 and delivered to the switcher Input1 206*a*. The 1920×1080, 60 Hz video signal is then delivered to the Mux 210 at Mux input In1 208*a*. The Mux 210 provides a connection between the Mux input In1 208*a* and the Mux output Out1 212 so that the 1920×1080, 60 Hz video signal is outputted from the Mux output Out1 212 to the switcher Output 214. The 1920×1080, 60 Hz video signal is thereafter delivered to the Sink 216.

A second video signal having, for example, a 1920×1080 resolution but at a 50 Hz frame rate is outputted by Source2 222 and delivered to the switcher Input2 206*b* and then to the Mux input In2 208*b*. The Mux input In2 208*b* is not connected to a Mux output so that the 1920×1080, 50 Hz video signal is not further delivered.

FIG. 2B shows the video distribution network 200 during a transition that follows a switching operation. Specifically, the Mux 210 has now disconnected the Mux output Out1 212 from the Mux input In1 208*a* so that no video signal is being delivered to the Mux output Out1 212. As a result, either no signal or an unstable signal is delivered from the Mux output Out1 212 to the switcher Output 214. During this transition, the Mux 210 verifies that it is authorized to receive content from the Source2 222 and then affirms to the Source2 222 that it is authorized to receive the content. Then, private keys are exchanged between the Source2 222 and the Mux 210. At the same time that these exchanges occur, and until the Mux 210 achieves authentication of the Source2 222, either no signal or an unstable signal is delivered to the switcher Output 214.

In accordance with an embodiment, during this interval, the switcher Output 214 delivers a temporary video signal to the Sink 216. This temporary video signal has a frame rate that is the minimum VRR frame rate supported by the Sink 216. Preferably, the temporary video signal contains the last frame that was received from the Source 1 202 but now repeatedly delivered at the minimum VRR frame rate by the Output 214 to the Sink 216. For example, when the minimum VRR frame rate supported by the Sink 216 is 48 Hz, the switcher Output 214 converts the last 60 Hz frame that it received from the Source 202 into a frame having a 48 Hz frame rate, and then repeatedly re-transmits this 48 Hz frame to the Sink 216 until authentication is attained.

Upon achieving successful authentication, the Output 214 discontinues delivering the 48 Hz frame rate video signal. As FIG. 2C shows, the Mux 210 now connects the Mux input In2 208*b* to the Mux output 212 so that now a 1920×1080, 50 Hz video signal is provided by the Source2 222 and delivered to the Sink 216.

In this manner, switching from receiving a first video signal from Source1 202 to receiving a second video signal from Source2 222, such as, for example, the transition from receiving and delivering a 1920×1080, 60 Hz video signal to receiving and delivering 1920×1080, 50 Hz video signal, is carried out seamlessly and with minimal noticeable disruption to the end user. Moreover, because the Mux 210 continued to transmit a temporary video signal to the Sink 216 during this transition, the sink remains HDCP authenticated, and a video lock may also be maintained between the Mux 210 and the Sink 216, thereby reducing the time required to transition from Source1 202 to Source2 220.

Additionally, during the transition to the new input signal, the, e.g., 48 Hz frame rate video signal contains an extended front porch interval due to its lower frame rate. When the extended front porch interval aligns with the new 50 Hz input signal, the system jumps the output sync to the new 50 Hz input signal frame rate, thereby allowing the TV to seamlessly process the new input signal without interruption.

Though FIGS. 2A-2C depict switching from a first source providing a 1920×1080, 60 Hz video signal to a second source providing a 1920×1080, 50 Hz video signal, the resolution and frame rate shown are merely examples. Transitions between other resolutions and frame rates are within the scope of the embodiments. Moreover, though FIGS. 2A-2C depict a sink supporting a minimum VRR frame rate of 48 Hz, the value is likewise merely an example, and other a minimum supported VRR frame rates are also within the scope of the embodiments.

For example, a first video signal having a 1920×1080 video resolution at a 60 Hz frame rate and an RGB color space, i.e., a 1920×1080, 60 Hz RGB video signal, may be provided by Source1 202 and initially delivered to the switcher 204. A scaler located within the switcher 204, such as within the Mux 210 or within the Output 214, converts the 1920×1080, 60 Hz RGB video signal to a video signal having a 3840×2160 video resolution at a 60 Hz frame rate and an Y444 color space, that is, the scaler outputs a 3840×2160, 60 Hz Y444 VRR, and this video signal is delivered to the Sink 216.

A second video signal having a 4096×2160 video resolution at a 50 Hz frame rate and a Y444 color space, i.e., a 4096×2160, 50 Hz Y444 video signal, may be provided by Source2 220. When the Mux switches from receiving the first video signal from Source1 202 to receiving the second video signal from Source2 220, no input is delivered to the scaler during the switching transition. Rather, the scaler outputs a temporary video signal in which the last 3840×2160, 60 Hz Y444 VRR video frame it had received is now repeatedly outputted at the minimum 48 Hz VRR frame rate supported by the Sink 216.

Then, upon achieving successful authentication and video lock, the scaler discontinues outputting the 3840×2160, 48 Hz Y444 frame. The scaler now begins receiving the 4096×2160, 50 Hz Y444 video signal provided by Source2 220, converts this video signal into a 3840×2160, 50 Hz Y444 VRR video signal, and delivers the new signal to the Sink 216.

Also, though FIGS. 2A-2C depict switching from a first source to a second source when the first video signal and the second video signal have different frame rates and/or different resolutions, the video distribution network 200 also provides advantages when the first video signal and the second video signal have the same frame rate. Typically, even when the first and second video signals have the same frame rate, the timing of the first video signal is not synchronized to the timing of the second video signal. That is, the first and second video signals are asynchronous. As a result, a latency may be introduced during the transition from the first video signal to the second video signal which may be noticeable to the user.

The video distribution network 200 of FIGS. 2A-2C, however, provides a transition that is carried out seamlessly and with minimal noticeable disruption to the end user even when the first and second video signals are asynchronous because a repeated frame is delivered in a temporary video signal having the minimum VRR frame rate supported by the Sink 216.

FIGS. 3 and 4A-4C show in greater detail the steps carried out by a repeater device, such as the video distribution network 200 shown in FIGS. 2A-2C, according to an embodiment.

FIG. 3 is a flow chart 300 showing the steps carried out when a repeater device is first connected to a sink device. Initially, as shown at 300, the repeater device is in a disconnected state, for example, when the switcher 204 is not connected to a sink or other display device.

Next, as shown at 304, the repeater device is connected to the display or other sink device, such as by connecting the Output 214 of the switcher 204 to the Sink 216. Then, as shown at 306, the repeater device reads the extended display information data (EDID) stored in the display or other sink, such as the switcher 204 reading the EDID stored in the Sink 216.

The EDID contains data that describes the capabilities of a sink or other display device and may be provided to a source device. The EDID may include some or all of a manufacturer name and serial number, a product type, a phosphor or filter type (as chromaticity data), timings supported by the display, a display size, luminance data and pixel mapping data. Additionally, the EDID includes a minimum variable refresh rate (minimum VRR) and a maximum variable refresh rate (maximum VRR) of the display. The VRR of the display refers to the manner by which a display adjusts its refresh rate to match the frame rate of the source device. The minimum VRR is the minimum frame rate at which the VRR feature is still working properly. Similarly, the maximum VRR is the maximum frame rate at which the VRR feature works properly.

After the repeater device reads the EDID stored in the sink or other display device, the repeater device saves the data to store the sink's display capabilities, as shown at 308.

FIGS. 4A-4C is a flow chart 400 showing an example of the steps carried out by a repeater device while the repeater device switches from one source device to another according to an embodiment, such as when the switcher 204 of FIGS. 2A-2C switches from being first connected to Source1 202 to being connected to Source2 220.

First, as shown at 402 in FIG. 4A, the repeater device is in a steady state while it receives a video signal having a fixed resolution and frame rate from a first source device. The known repeater device then transmits the received video signal to a display or other sink device.

Then, as 404 shows, a switch from the first source device to another source device is initiated, such when a user desires to switch from receiving content contained in the first video signal to receiving content contained in the second video signal.

As 406 shows, the repeater device next prepares to switch from being connected to the output of one source device to a being connected to the output of another source device. Namely, the repeater device disconnects from the first source device. For example, the Mux 210 of the Switcher 204 severs the connection between the Mux Input In1 **208*a* and the Mux output Out1 212**.

Next, as 408 shows, the repeater device determines whether the sink or other display device supports a variable refresh rate (VRR), such as by the Switcher 204 determining whether the Sink 216 supports a VRR. If the sink or other display device does not support a VRR, then the repeater device proceeds in the manner shown in FIG. 4B while the repeater device is authenticated by the new source device and achieves a video lock. Alternatively, if the repeater device determines that the sink or other display device supports a variable refresh rate (VRR), then according to an embodiment, the repeater device proceeds in the manner shown in FIG. 4C while the repeater device is authenticated by the new source device and achieves a video lock.

Referring now to FIG. 4B, if the sink or other display device does not support a variable refresh rate (VRR), then the repeater device delivers blank video frames to the display, as 410 shows. The repeater device delivers these blank video frames at the same resolution and frame rate as the video signal that was received from the prior source.

Then, as 412 shows, the multiplexer of the repeater device reconfigures its connections to be able to transfer the video signal received from the second source device to the display while continuing to deliver blank video frames.

Next, as 414 shows, the repeater device begins converting the frame rate of the video signal that is received from the new source device. The frame rate of the new video signal is converted to the frame rate supported by the display, that is, the same frame rate as that of the video signal previously delivered to the display.

Thereafter, as 416 shows, the repeater device stops delivering the blank video frames to the display, and the converted video signal received from the new source device is now delivered to the display.

As 418 shows, the transition from the video signal of the first source device to the video signal of the second source device is now completed.

Referring back to 408 in FIG. 4A, if the repeater device determines that the sink or other display device supports a VRR, then the repeater device proceeds in the manner shown in FIG. 4C according to an embodiment while the repeater device authenticates the new source device.

As shown at 420, the repeater device produces a temporary output signal having a frame rate that is at the minimum VRR supported by the display. For example, the switcher 204 causes the Output 214 to output a temporary video signal having a frame rate that is at the minimum VRR frame rate supported by the Sink 216. When this minimum VRR frame rate is 48 Hz, the Output 214 outputs a 48 Hz video signal.

The resolution of the temporary signal is the same as that of the first video signal. In the current example, the resolution of the temporary video signal produced by the Output 214 remains the same as that of the signal that was received from Source1 202.

Then, as 422 shows, the multiplexer of the repeater device now carries out internal changes, such as to provide a connection between the new source device and the sink. For example, the Switcher 204 causes the Mux 210 to connect the Mux input In2 **208*b* to the Mux output Out1 212. As a result, the second video signal provided by the Source2 222, which was delivered to the Mux input In2 208*b* via the Switcher Input2 206*b*, is now further delivered to Mux output Out1 212 and thereafter to the switcher Output 214**.

Next, as 424 shows, the new video signal stabilizes upon achieving successful authentication and video lock. If the resolution of the second video signal is supported by the sink device, the resolution of the second video signal is not changed by the repeater. For example, when a 1920×1080, 50 Hz video signal is provided by the Source2 222, the switcher Output 214 delivers this 1920×1080, 50 Hz video signal to the Sink 216.

Alternatively, if the second video signal provided by the Source2 222 does not have a resolution supported by the Sink 216, a scaler (not shown) located within the Mux 212 converts the resolution of the new video signal to a resolution supported by the Sink 216, and once video lock is attained, the switcher Output 214 may now deliver the newly scaled 50 Hz video signal to the Sink 216.

Thereafter, as 426 shows, the switching from one video signal source to another has been completed.

In this manner, the repeater device switches from delivering a first video signal provided by a first source to delivering a second video signal provided by a second source. Because during the transition the repeater device temporarily transmits a minimum VRR frame rate video signal to the sink, the transition is made seamlessly and with minimal noticeable disruption to the user. Moreover, because of the transmission of the minimum VRR frame rate video signal during the transition, there is no interruption in the signals being delivered to the sink. The sink therefore remains HDCP authenticated, and a video lock is maintained between the repeater device and the sink, thereby reducing the time required to transition from one source to another source.

FIGS. 5A-5C show an example of a video distribution network 500 in accordance with another embodiment in which the repeater functions are distributed among encoders and a decoder connected to each other over a data network. A first source, namely, Source1 502, outputs a first video signal containing audiovisual data and having a first resolution and a first frame rate. The Source1 502 outputs the first video signal to a first encoder, namely, Encoder1 504, which is capable of connecting to a data network 506.

A second source, namely, Source2 512, outputs a second video signal containing audiovisual data and having a second resolution and a second frame rate, which may be different than the first resolution and/or the first frame rate. The Source1 502 outputs the second video signal to a second encoder, namely, Encoder2 514, which is similarly capable of connecting to the data network 506.

A Decoder 508 is capable of connecting to the Source1 502 via the Encoder1 504 and the data network 506 or, alternatively, to the Source2 512 via the Encoder2 514 and the data network 506. The Decoder 508 is also connected to a Sink 510.

FIGS. 5A-5C further show an example of a transition in which the Decoder 508 switches from delivering the first video signal provided by the Source1 502 to delivering the second video signal provided by the Source2 512.

FIG. 5A shows the video distribution network 500 in its initial steady state during which the Decoder 508 has previously authenticated the Source1 502 and the Sink 510 and is now subscribed to receive the first video signal from the Source1 502 via the Encoder1 504 and the data network 506. The first video signal may have, for example, a 1920×1080 resolution at a 60 Hz frame rate. The 1920×1080, 60 Hz video signal is thereafter sent by the Decoder 508 to the Sink 510.

The second video signal, which may have, for example, a 1280×720 resolution at a 50 Hz frame rate, is outputted by the Source2 512 and delivered to the Encoder2 514. At this time, the 50 Hz video signal is not sent over the network 506 to the Decoder 508.

FIG. 5B shows the video distribution network 500 during the transition following the switching operation. Specifically, the Decoder 508 receives a request, such as from an end user, to receiving the content provided by the Source2 512 and contained in the second video signal. The Decoder 508 terminates its data connection with the Encoder1 504 so that the 1920×1080, 60 Hz video signal is no longer received by the Decoder 508.

In accordance with the embodiment, the Decoder 508 recognizes that it has entered a transitional state in which it no longer receives the 1920×1080, 60 Hz video signal from the Encoder1 504 but has not completed establishing a data connection with the Encoder2 514 to receive the 1280×720, 50 Hz video signal provided by the Source2 512. During this transitional state, the Decoder 508 first verifies that it is authorized to receive content from the Source2 512, affirms to the Source2 512 that it is authorized to receive the content, and then private keys are exchanged between the Encoder2 514 and the Decoder 508. At the time these exchanges occur, and until the Decoder 508 attains authentication with the Source2 512 and achieves a video lock, either no signal or an unstable signal would ordinarily be delivered to the Sink 510.

However, in accordance with the embodiment, the Decoder 508 delivers a temporary video signal during this interval to the Sink 510. The temporary video signal is at the same resolution as the first video signal but is at the minimum VRR frame rate supported by the Sink 510. Preferably, the temporary video signal contains the last frame previously delivered to the Sink 510 from the first video signal, but now repeatedly transmitted at the minimum VRR frame rate. For example, when the first video signal is at a resolution of 1920×1080 and at a 60 Hz frame rate, and the minimum VRR frame rate supported by the Sink 510 is 48 Hz, the Decoder 508 repeatedly transmits the last 1920×1080 frame from the first video signal, but at the 48 Hz minimum VRR frame rate. The Decoder 508 transmits this 1920×1080, 48 Hz temporary video signal to the Sink 510.

Upon achieving successful authentication and video lock, the Decoder 508 discontinues delivering the temporary video signal to the Sink 510. Namely, the Decoder 508 discontinues delivering the repeating frame of the 1920×1080, 48 Hz video signal.

Then, as FIG. 5C shows, the Decoder 508 now receives the second video signal from the Source2 512 via the Encoder2 514 and the network 506, namely, the Decoder 508 now receives the 1280×720, 50 Hz video signal. The Decoder 508 converts the received 1280×720, 50 Hz video signal into a video signal having a resolution supported by the Sink 510, such as into a 1920×1080, 50 Hz video signal. A scaler located within the Decoder 508 may be used to carry out this conversion. The Decoder 508 then delivers the scaled 1920×1080, 50 Hz video signal to the Sink 510 to be displayed.

In this manner, switching from a first video source to a second video source, such as the transition from receiving and displaying the 1920×1080, 60 Hz video signal provided by the Source1 502 to receiving the 1280×720, 50 Hz video signal provided by the Source2 512 and displaying the 1920×1080, 50 Hz video signal, is carried out seamlessly and with minimal disruption noticeable by the end user. Moreover, because the Decoder 508 continued to transmit a video signal to the Sink 510 during this transition, the Sink 510 remains HDCP authenticated and a video lock is maintained between the Decoder 508 and the Sink 510, thereby reducing the time required to transition from displaying the content received from the Source1 502 to displaying the content received from the Source2 512.

Though FIGS. 5A-5C depict switching from a first source providing a 1920×1080, 60 Hz video signal to a second source providing a 1280×720 50 Hz video signal, these values are merely examples. Transitions between other resolutions and/or other frame rates are also within the scope of the embodiments. Moreover, though FIGS. 5A-5C depict a sink supporting a minimum VRR frame rate of 48 Hz, the value is likewise merely an example, and other minimum supported VRR frame rates are also within the scope of the embodiments.

For example, a 1920×1080, 60 Hz RGB first video signal may be provided by the Source1 502 to the Encoder 1 504 and delivered over the network 506 to the Decoder 508. A scaler located within the Decoder 508 may convert the 1920×1080, 60 Hz RGB video signal to, for example, a 3840×2160, 60 Hz Y444 VRR video signal that is supported by the Sink 510. The Decoder 508 then delivers the scaled 3840×2160, 60 Hz Y444 VRR video signal to the Sink 510.

In this example, the second video signal may be a 4096×2160, 50 Hz Y444 video signal that is provided by the Source2 512 to the Encoder2 514. When a transition from receiving the 1920×1080, 60 Hz RGB first video signal to receiving the 4096×2160, 50 Hz Y444 second video signal is initiated, the Decoder 508 first terminates the data connection to the Encoder 1 504 over the network 506 to terminate receiving the 1920×1080, 60 Hz RGB first video signal. Then, the Decoder 508 initiates authentication of the Source2 512.

While the authentication is being carried out, the Decoder 508 repeatedly outputs the last frame that was delivered to the sink but now at a 48 Hz frame rate, namely, the lowest frame rate supported by the Sink 510. That is, the Decoder 508 repeatedly outputs the last frame of the 3840×2160, 60 Hz Y444 VRR video signal that was outputted by the scaler of the Decoder 508 to the Sink 510, but now repeatedly outputs that frame at a 48 Hz frame rate.

Then, upon achieving successful authentication and video lock, the Decoder 508 discontinues repeatedly outputting the 3840×2160, 48 Hz Y444 frame. The scaler now begins receiving the 4096×2160, 50 Hz Y444 second video signal from Encoder2 514, converts this video signal into a 3840×2160, 50 Hz Y444 VRR video signal. The Decoder 508 now delivers the newly converted signal to the Sink 510.

Also, though FIGS. 5A-5C depict switching from a first source to a second source when the first video signal and the second video signal have different frame rates and/or different resolutions, the video distribution network 500 also provides advantages when the first video signal and the second video signal have the same frame rate. Typically, even when the first and second video signals have the same frame rate, the timing of the first video signal is not synchronized to the timing of the second video signal. That is, the first and second video signals are asynchronous. As a result, a latency may be introduced during the transition from the first video signal to the second video signal which may be noticeable to the user.

The video distribution network 500 of FIGS. 5A-5C, however, provides a transition that is carried out seamlessly and with minimal noticeable disruption to the end user even when the first and second video signals are asynchronous because a repeated frame is delivered in a temporary video signal having the minimum VRR frame rate supported by the Sink 510.

FIG. 6 is a diagram showing an example of some of the functions carried out by the Decoder 508 of FIGS. 5A-5C according to an embodiment. For example, Input Video Management 522 is carried out on the video signal received by the Decoder 508, and then the video signal is decompressed, such as using a Coder-Decoder (Codec) 524. As each frame of the video signal is decoded, that frame is held in a Frame Buffer 526 until a Scaler 530 converts the frame to another resolution. Output Video Management 532 may then be performed on the scaled video frame prior to delivery to the Sink 510.

Alternatively, the frame held in the Frame Buffer 526 may be moved to a Memory 528, and a frame previously stored in the Memory 532 may be delivered to the Frame Buffer 526 and then to the Scaler 530.

FIG. 7 is a flow chart 700 showing an example of the steps carried out by a networked repeater device while the networked repeater device switches from a first video signal source to a second video signal source, such as when the Decoder 508 of FIGS. 5A-5C switches from the first video signal outputted by the Source1 502 to the Encoder1 504 to the second video signal outputted by the Source2 512 to the Encoder2 514.

First, as shown at 702, the networked repeater device is in a steady state while it receives a first video signal at a fixed resolution from a previously authenticated first source device. The networked repeater device then transmits the received first video signal to a previously authenticated display or other sink device. For example, the Decoder 508 is in a steady state while it receives the first video signal outputted by Source1 502, which may be the 1920×1080, 60 Hz video signal, and transmits the received video signal to the Sink 516.

Then, as 704 shows, a switch from receiving the first video signal provided by the first source device is carried out, such as when a user switches from viewing the content contained in the first video signal by requesting to viewing the content contained in the second video signal.

As 706 shows, the networked repeater device next prepares to connect to the output of the second source device. For example, the Decoder 508 may terminate the receiving and displaying of the 1920×1080, 60 Hz first video signal generated by the Source1 502 by terminating the data connection with the Encoder1 504 over the network 506.

The networked repeater device then initiates establishing HDCP authentication with the new source device over the network. While the HDCP authentication is being established, the networked repeater device is neither able to deliver the first video signal received from the first source device nor deliver the second video signal received from the second source device. For example, the Decoder 508 may initiate HDCP authentication with the Source2 512 over the network 506, and while HDCP authentication is being established, the Decoder 508 is neither able to transmit the 1920×1080, 60 Hz first video signal provided by the Source1 502 nor transmit the 1280×720, 50 Hz second video signal provided by the Source2 512.

Next, as 708 shows, the networked repeater device determines whether the sink or other display device supports a variable refresh rate (VRR). For example, the Decoder 508 may determine whether the Sink 510 supports a VRR. If the sink does not support a VRR, then the networked repeater device delivers blank video frames to the sink or other display device until HDCP authentication and video lock are being established, in a manner analogous to the that shown in FIG. 4B.

Alternatively, if a VRR is supported by the sink, the networked repeater device then outputs a temporary video signal having the minimum VRR frame rate supported by the sink or display, as 710 shows. The resolution of the temporary video signal is the same as that of the first video signal. Preferably, the temporary video signal is comprised of the last frame received from the first video signal by the networked repeater. This frame is transmitted repeatedly as the temporary video signal.

For example, the Frame Buffer 526 of the Decoder 508 stores the last frame received from the Source1 502 via the Encoder1 504 and the network 506. The Decoder 508 then repeatedly outputs the frame stored in Frame Buffer 526 as a temporary video signal at the minimum VRR frame rate supported by the display of the Sink 516. When the minimum VRR frame rate supported by the Sink 516 is 48 Hz, the Decoder 508 outputs a 48 Hz temporary video signal to the Sink 516 at the same 1920×1080 resolution.

Then, as 712 shows, the networked repeater device provides a data connection between the new source device and the sink to enable receiving the second video signal. For example, the Decoder 508 connects to the Source2 512 via the network 506 and the Encoder2 514 to enable receiving the 1280×720, 50 Hz second video signal.

Next, as 714 shows, the new video signal stabilizes upon the networked repeater device achieving successful authentication and video lock, and the networked repeater device now converts the resolution of the second video signal to the resolution supported by the sink device. For example, the Scaler 530 of the Decoder 508 converts the 1280×720, 50 Hz second video signal to the 1920×1080 resolution supported by the Sink 510. The Output Video Management of the Decoder 508 now delivers the converted video signal to the Sink 516.

Thereafter, as 716 shows, the switching from receiving a first video signal to receiving a second video signal has been completed.

FIGS. 8A-8C show an example of a video distribution network 800 in accordance with another embodiment in which a decoder transmits a temporary video signal comprised of a repeating black frame or blank frame during a transition from a first video signal having a particular resolution and frame rate to a second video signal having a different resolution and/or frame rate. As in FIGS. 5A-5C, the temporary repeating black frame or blank frame is delivered at the minimum VRR frame rate supported by the sink device. However, the video distribution network 800 employs a Decoder 808 that is simpler in function than the Decoder 508 shown in FIG. 6.

A first source, namely, Source1 802, outputs a first video signal containing audiovisual data and having a first resolution and a first frame rate. The Source1 802 outputs the first video signal to a first encoder, namely, Encoder1 804, which is capable of connecting to a data network 806.

A second source, namely, Source2 812, outputs a second video signal containing audiovisual data and having a second resolution and a second frame rate, which may be different than the first resolution and/or the first frame rate. The Source1 802 outputs the second video signal to a second encoder, namely, Encoder2 814, which is similarly capable of connecting to the data network 806.

A Decoder 808 is capable of connecting to the Source1 802 via the Encoder1 804 and the data network 806 or, alternatively, to the Source2 812 via the Encoder2 814 and the data network 806. The Decoder 808 is also connected to a Sink 810.

FIGS. 8A-8C further show an example of a transition in which the Decoder 808 switches from receiving the first video signal generated by the Source1 802 to receiving the second video signal generated by the Source2 812.

FIG. 8A shows the video distribution network 800 in its initial steady state during which the Decoder 808 has previously authenticated the Source1 802 and the Sink 810 and is now subscribed to receive the first video signal from the Source1 802 via the Encoder1 804 and the data network 806. The first video signal may have, for example, a 1920×1080 resolution at a 60 Hz frame. The 1920×1080, 60 Hz video signal is thereafter sent by the Decoder 808 to the Sink 810.

The second video signal, which may have, for example, a 1280×720 resolution at a 50 Hz frame rate, is outputted by the Source2 812 and delivered to the Encoder2 814. At this time, the 1280×720, 50 Hz video signal is not sent over the network to the Decoder 808.

FIG. 8B shows the video distribution network 800 during the transition following the switching operation. Specifically, the Decoder 808 receives a request, such as from an end user, to start receiving the content provided by the Source2 812 and contained in the second video signal. The Decoder 808 terminates its data connection with the Encoder1 804 so that the 1920×1080, 60 Hz video signal is no longer being received by the Decoder 808.

In accordance with the embodiment, the Decoder 808 recognizes that it has entered a transitional state in which it no longer receives the 1920×1080, 60 Hz video signal from the Encoder1 804 but has not completed establishing a connection with the Encoder2 814 to receive the 1280×720, 50 Hz video signal provided by the Source2 812. During this transitional state, the Decoder 808 first verifies that it is authorized to receive content from the Source2 812, affirms to the Source2 812 that it is authorized to receive the content, and then private keys are exchanged between the Encoder2 814 and the Decoder 808. At the time these exchanges occur, and until the Decoder 808 attains authentication with the Source2 812 and achieves a video lock, either no signal or an unstable signal would ordinarily be delivered to the Sink 810.

However, in accordance with the embodiment, the Decoder 808 delivers a temporary video signal during this interval to the Sink 810. The temporary video signal is at the same resolution as the first video signal but at the minimum VRR frame rate supported by the Sink 810. Because the Decoder 808 is functionally simpler than the Decoder 508 of FIGS. 5A-5C and 6, there is no frame buffer to store the last frame delivered to the Sink 510 from the first video signal. Rather, the temporary video signal is comprised of a black frame or a blank frame delivered repeatedly at the minimum supported VRR frame rate. For example, when the minimum VRR frame rate supported by the Sink 810 is 48 Hz, the Decoder 808 outputs a repeating black frame or blank frame having the same 1920×1080 resolution as the first video signal but at the 48 Hz minimum VRR frame rate. The Decoder 808 then this 1920×1080, 48 Hz temporary video signal to the Sink 810.

Upon achieving successful authentication and video lock, the Decoder 808 discontinues delivering the temporary video signal to the Sink 510. Namely, the Decoder 508 discontinues delivering the repeating 1920×1080, 48 Hz black frame or blank frame of the temporary video signal.

Then, as FIG. 8C shows, the Decoder 808 now receives the second video signal provided by the Source2 812 via the Encoder2 814 and the network 806, namely, the Decoder 808 now receives the 1280×720, 50 Hz video signal. The Decoder 808 then converts the received 1280×720, 50 Hz video signal into a video signal having a resolution supported by the Sink 510, such as into a 1920×1080, 50 Hz video signal. A scaler located within the Decoder 808 may be used to carry out this conversion. The Decoder 808 then delivers the scaled 1920×1080, 50 Hz video signal to the Sink 810 to be displayed.

In this manner, the switching from a first video source to a second video source, such as the transition from receiving and displaying the 1920×1080, 60 Hz video signal provided by the Source1 802 to receiving the 1280×720, 50 Hz video signal provided by the Source2 812 and displaying the 1920×1080, 50 Hz video signal, is carried out seamlessly and with minimal disruption noticeable by the end user. Moreover, because the Decoder 808 continued to transmit a video signal to the Sink 810 during this transition, the Sink 810 remains HDCP authenticated and a video lock is maintained between the Decoder 808 and the Sink 810, thereby reducing the time required to transition from displaying the content received from the Source1 802 to displaying the content received from the Source2 812.

Though FIGS. 8A-8C depict switching from a first source providing a 1920×1080, 60 Hz video signal to a second source providing a 1280×720 50 Hz video signal, these values are merely examples. Transitions between other resolutions and/or other frame rates are also within the scope of the embodiments. Moreover, though FIGS. 8A-8C depict a sink supporting a minimum VRR frame rate of 48 Hz, the value is likewise merely an example, and other minimum supported VRR frame rates are also within the scope of the embodiments.

FIG. 9 is a diagram showing an example of some of the functions carried out by the Decoder 808 of FIGS. 8A-8C according to an embodiment. For example, Input Video Management 822 is carried out on the received video signal. The video signal is then decompressed, such as using a Coder-Decoder (Codec) 824. The decoded video signal is then converted to another resolution, such as by a Scaler 826. Output Video Management 828 may then be performed on the scaled video frame prior to delivery to the Sink 810.

The Decoder 808 of FIGS. 8A-8C and 9 is simpler in function than the Decoder 508 of FIGS. 5A-5C and 6 in that no frame buffer or memory is employed during the transition from the first video signal to the second video signal. Instead, the repeating black frame or blank frame is delivered rather than the repeating last frame as is used in the video distribution network 500 of FIGS. 5A-5C. Because a simpler Decoder 808 is employed, the cost of the video distribution network 800 is reduced.

FIG. 10 is a flow chart 1000 showing an example of the steps carried out by a networked repeater device while the networked repeater device switches from a first video signal source to a second video signal source, such as when the Decoder 808 of FIGS. 8A-8C switches from the first video signal outputted by the Source1 802 to the Encoder1 804 to the second video signal outputted by the Source2 812 to the Encoder2 814.

First, as shown at 1002, the networked repeater device is in a steady state while it receives a first video signal at a fixed resolution from a previously authenticated first source device. The networked repeater device then transmits the received first video signal to a previously authenticated display or other sink device. For example, the Decoder 808 is in a steady state while it receives the first video signal outputted by Source1 802, which may be the 1920×1080, 60 Hz video signal, and transmits the received video signal to the Sink 816.

Then, as 1004 shows, a switch from receiving the first video signal provided by the first source device is carried out, such as when a user switches from viewing the content contained in the first video signal by requesting to view the content contained in the second video signal.

As 1006 shows, the networked repeater device next prepares to connect to the output of the second source device. For example, the Decoder 808 may terminate the receiving and displaying of the 1920×1080, 60 Hz first video signal generated by the Source1 802 by terminating the data connection with the Encoder1 804 over the network 806.

The networked repeater device then initiates establishing HDCP authentication with the new source device over the network. While the HDCP authentication is being established, the networked repeater device is neither able to deliver the first video signal received from the first source device nor deliver the second video signal received from the second source device. For example, the Decoder 808 may initiate HDCP authentication with the Source2 812 over the network 806, and while the HDCP authentication and video lock are being established, the Decoder 808 is neither able to transmit the 1920×1080, 60 Hz first video signal provided by the Source1 802 nor transmit the 1280×720, 50 Hz second video signal provided by the Source2 812.

Next, as 1008 shows, the networked repeater device determines whether the sink or other display device supports a variable refresh rate (VRR). For example, the Decoder 808 may determine whether the Sink 810 supports a VRR. If the sink does not support a VRR, then the networked repeater device delivers blank video frames to the sink or other display device until HDCP authentication and video lock are being established, in a manner analogous to that shown in FIG. 4B.

Alternatively, if a VRR is supported by the sink, the networked repeater device then outputs a temporary video signal having the minimum VRR frame rate supported by the sink or display, as 1010 shows. The resolution of the temporary video signal is the same as that of the first video signal. Preferably, the temporary video signal is comprised of a black frame or blank frame which is transmitted repeatedly as the temporary video signal.

For example, the Decoder 808 outputs a temporary video signal comprised of the repeating black frame or blank frame at the minimum VRR frame rate supported by the display of the Sink 816 but at the same resolution as the first video signal. When the minimum VRR frame rate supported by the Sink 816 is 48 Hz, the Decoder 808 outputs a 48 Hz video signal to the Sink 816 at the 1920×1080 resolution.

Then, as 1012 shows, the networked repeater device provides a connection between the new source device and the sink to enable receiving the second video signal. For example, the Decoder 808 connects to the Source2 812 via the network 806 and the Encoder2 814 to enable receiving the 1280×720, 50 Hz second video signal.

Next, as 1014 shows, the new video signal stabilizes upon the networked repeater device achieving successful authentication and video lock, and the networked repeater device now converts the resolution of the second video signal to the resolution supported by the sink device. For example, the Scaler 830 of the Decoder 808 converts the 1280×720, 50 Hz second video signal to the 1920×1080 resolution supported by the Sink 810. The Output Video Management of the Decoder 808 now delivers the converted video signal to the Sink 816.

Thereafter, as 1016 shows, the switching from receiving a first video signal to receiving a second video signal has been completed.

FIGS. 11A-11C show an example of a video distribution network 1100 in accordance with yet another embodiment in which a decoder transmits a temporary video signal comprised of a repeating black frame or blank frame during a transition from a first video signal having a particular resolution and frame rate to a second video signal having a different resolution and/or frame rate. As in FIGS. 5A-5C and 8A-8C, the temporary repeating black frame or blank frame is delivered at the minimum VRR frame rate supported by the sink device.

However, the video distribution network 1100 employs a Decoder 1108 that is simpler in function than the Decoder 508 shown in FIG. 6 in that no frame buffer or memory is employed. The Decoder 1108 is also functionally simpler than the Decoder 508 shown in FIG. 6 and the Decoder 808 shown in FIG. 9 in that scaling of the video signal is not carried out. Rather, the source devices of the video distribution network 1100 are set to output respective video signals at a resolution that is matched to the resolution of the sink device, thus eliminating the need for a scaling.

A first source, namely, Source1 1102, outputs a first video signal containing audiovisual data and having a first resolution and a first frame rate. The Source1 1102 outputs the first video signal to a first encoder, namely, Encoder1 1104, which is capable of connecting to a data network 1106.

A second source, namely, Source2 1112, outputs a second video signal containing audiovisual data and having a second resolution and a second frame rate, which may be different than the first resolution and/or the first frame rate. The Source1 1102 outputs the second video signal to a second encoder, namely, Encoder2 1114, which is similarly capable of connecting to the data network 1106.

A Decoder 1108 is capable of connecting to the Source1 1102 via the Encoder1 1104 and the data network 1106 or, alternatively, to the Source2 1112 via the Encoder2 1114 and the data network 1106. The Decoder 1108 is also connected to a Sink 1110.

FIGS. 11A-11C further show an example of a transition in which the Decoder 1108 switches from receiving the first video signal generated by the Source1 1102 to receiving the second video signal generated by the Source2 1112.

FIG. 11A shows the video distribution network 1100 in its initial steady state during which the Decoder 1108 has previously authenticated the Source1 1102 and the Sink 1110 and is now subscribed to receive the first video signal from the Source1 1102 via the Encoder1 1104 and the data network 1106. The first video signal may have, for example, a 1920×1080 resolution at a 60 Hz frame. The 1920×1080, 60 Hz video signal is thereafter sent by the Decoder 1108 to the Sink 1110.

The second video signal, also having the 1920×1080 resolution supported by the Sink 1110 but at a 50 Hz frame rate, is outputted by the Source2 1112 and delivered to the Encoder2 1114. At this time, the 1920×1080, 50 Hz video signal is not sent over the network to the Decoder 1108.

FIG. 11B shows the video distribution network 1100 during the transition following the switching operation. Specifically, the Decoder 1108 receives a request, such as from an end user, to start receiving the content provided by the Source2 1112 and contained in the second video signal. The Decoder 1108 terminates its data connection with the Encoder1 1104 so that the 1920×1080, 60 Hz video signal is no longer received by the Decoder 1108.

In accordance with the embodiment, the Decoder 1108 recognizes that it has entered a transitional state in which it no longer receives the 1920×1080, 60 Hz video signal from the Encoder1 1104 but has not completed establishing a connection with the Encoder2 1114 to receive the 1920×1080, 50 Hz video signal provided by the Source2 1112. During this transitional state, the Decoder 1108 first verifies that it is authorized to receive content from the Source2 1112, affirms to the Source2 1112 that it is authorized to receive the content, and then private keys are exchanged between the Encoder2 1114 and the Decoder 1108. At the time these exchanges occur, and until the Decoder 1108 attains authentication with the Source2 1112 and achieves a video lock, either no signal or an unstable signal would ordinarily be delivered to the Sink 1110.

However, in accordance with the embodiment, the Decoder 1108 delivers a temporary video signal during this interval to the Sink 1110. The temporary video signal is at the same resolution as the first video signal but at the minimum VRR frame rate supported by the Sink 1110. Because the Decoder 1108 is functionally simpler than the Decoder 508 of FIGS. 5A-5C and 6 and the Decoder 808 of FIGS. 8A-8C and 9, there is no frame buffer to store the last frame delivered to the Sink from the first video signal. Rather, the temporary video signal is comprised of a black frame or a blank frame delivered repeatedly at the minimum supported VRR frame rate. For example, when the minimum VRR frame rate supported by the Sink 1110 is 48 Hz, the Decoder 1108 outputs a repeating black frame or blank frame having the same 1920×1080 resolution as the first video signal but at the 48 Hz minimum VRR frame rate. The Decoder 1108 then transmits this 1920×1080, 48 Hz temporary video signal to the Sink 810.

Upon achieving successful authentication and video lock, the Decoder 1108 discontinues delivering the temporary video signal to the Sink 1110. Namely, the Decoder 1108 discontinues delivering the 1920×1080, 48 Hz repeating black frame or blank frame of the temporary video signal.

Then, as FIG. 11C shows, the Decoder 1108 now receives the second video signal provided by the Source2 1112 via the Encoder2 1114 and the network 1106, namely, the Decoder 1108 now receives the 1920×1080, 50 Hz video signal. The Decoder 1108 then delivers this 1920×1080, 50 Hz video signal to the Sink 1110 to be displayed.

In this manner, the switching from a first video signal provided by a first source to the second video signal provided by a second source, such as the transition from receiving and displaying the 1920×1080, 60 Hz video signal provided by the Source1 1102 to receiving and then displaying the 1920×1080, 50 Hz video signal provided by the Source2 1112, is carried out seamlessly and with minimal disruption noticeable by the end user. Moreover, because the Decoder 1108 continued to transmit a video signal to the Sink 1110 during this transition, the Sink 1110 remains HDCP authenticated and a video lock is maintained between the Decoder 1108 and the Sink 1110, thereby reducing the time required to transition from displaying the content received from the Source1 1102 to displaying the content received from the Source2 1112.

Though FIGS. 11A-11C depict switching from a first source providing a 1920×1080, 60 Hz video signal to a second source providing a 1920×1080, 50 Hz video signal, these values are merely examples. Transitions between other frame rates at other resolutions are also within the scope of the embodiments. Moreover, though FIGS. 11A-11C depict a sink supporting a minimum VRR frame rate of 48 Hz, the value is likewise merely an example, and other minimum supported VRR frame rates are also within the scope of the embodiments.

FIG. 12 is a diagram showing an example of some of the functions carried out by the Decoder 1108 of FIGS. 11A-11C according to an embodiment. For example, Input Video Management 1122 is carried out on the received video signal. The video signal is then decompressed, such as using a Coder-Decoder (Codec) 1124. Output Video Management 828 may then be performed on the decoded video signal prior to delivery to the Sink 810.

The Decoder 1108 of FIGS. 11A-11C and 12 is simpler than the Decoder 508 of FIGS. 5A-5C and 6 in that no frame buffer or memory is needed because, during the transition from the first video signal to the second video signal, a repeating black frame or blank frame is delivered rather than the repeating last frame used in FIGS. 5A-5C. Moreover, The Decoder 1108 of FIGS. 11A-11C and 12 is further simpler than the Decoder 508 of FIGS. 5A-5C and 6 and the Decoder 808 of FIGS. 8A-8C and 9 in that no scaling is carried out. Rather, the resolution of the video signals received by the Decoder 1108 is already matched to the resolution supported by the Sink 1110. Because a simpler Decoder 1108 is employed, the cost of the video distribution network 1100 is further reduced.

FIG. 13 is a flow chart 1300 showing an example of the steps carried out by a networked repeater device while the networked repeater device switches from a from a first video signal source to a second video signal source, such as when the Decoder 1108 of FIGS. 11A-11C switches from receiving the first video signal outputted by the Source1 1102 to the Encoder1 1104 to receiving the second video signal stream outputted by the Source2 1112 to the Encoder2 1114.

First, as shown at 1302, the networked repeater device is in a steady state while it receives a first video signal at a fixed resolution from a previously authenticated first source device. The networked repeater device then transmits the received first video signal to a previously authenticated display or other sink device. For example, the Decoder 1108 is in a steady state while it receives the first video signal outputted by Source1 1102, which may be the 1920×1080, 60 Hz video signal, and transmits the received 1920×1080, 60 Hz video signal to the Sink 1116.

Then, as 1304 shows, a switch from receiving the first video signal provided by the first source device is carried out, such as when a user switches from viewing the content contained in the first video signal by requesting to view the content contained in the second video signal.

As 1306 shows, the networked repeater device next prepares to connect to the output of the second source device. For example, the Decoder 1108 may terminate the receiving and displaying of the 1920×1080, 60 Hz first video signal generated by the Source1 1102 by terminating the data connection with the Encoder1 1104 over the network 1106.

The networked repeater device then initiates establishing HDCP authentication with the new source device over the network. While the HDCP authentication is being established, the networked repeater device is neither able to deliver the first video signal received from the first source device nor deliver the second video signal received from the second source device. For example, the Decoder 1108 may initiate HDCP authentication with the Source2 1112 over the network 1106, and while the HDCP authentication is being established, the Decoder 1108 is neither able to transmit the 1920×1080, 60 Hz first video signal provided by the Source1 1102 nor transmit the 1920×1080, 50 Hz second video signal provided by the Source2 1112.

Next, as 1308 shows, the networked repeater device determines whether the sink or other display device supports a variable refresh rate (VRR). For example, the Decoder 1108 may determine whether the Sink 1110 supports a VRR. If the sink does not support a VRR, then the networked repeater device delivers blank video frames to the sink or other display device until HDCP authentication and video lock are being established, in a manner analogous to that shown in FIG. 4B.

Alternatively, if VRR is supported by the sink, the networked repeater device then outputs a temporary video signal having the minimum VRR frame rate supported by the sink or display, as 1310 shows. The resolution of the temporary video signal is the same as that of the first video signal. Preferably, the temporary video signal is comprised of a black frame or blank frame which is transmitted repeatedly as the temporary video signal.

For example, the Decoder 1108 outputs a temporary video signal comprised of the repeating black frame or blank frame at the minimum VRR frame rate supported by the display of the Sink 1116 but at the same resolution as the first video signal. When the minimum VRR frame rate supported by the Sink 1116 is 48 Hz, the Decoder 1108 outputs a 48 Hz video signal to the Sink 1116 at the prior 1920×1080 resolution.

Then, as 1312 shows, the networked repeater device provides a connection between the new source device and the sink to enable receiving the second video signal. For example, the Decoder 1108 connects to the Source2 1112 via the network 1106 and the Encoder2 1114 to enable receiving the 1920×1080, 50 Hz second video signal.

Next, as 1314 shows, the new video signal stabilizes upon the networked repeater device achieving successful authentication, and the networked repeater device now delivers the second video signal to the Sink 1116.

Thereafter, as 1316 shows, the switching from receiving a first video signal to receiving a second video signal has been completed.

In this manner, the networked repeater device switches from delivering a video signal provided by a first source device to delivering a video signal provided by another source device. Because the networked repeater device transmits a minimum VRR frame rate video signal to the sink during the transition, the transition is made seamlessly and with minimal disruption noticeable to the end user. Moreover, because the continued transmission of the minimum VRR frame rate video signal during the transition, the sink remains HDCP authenticated to the networked repeater device and a video lock is maintained between the networked repeater device and the sink, thereby reducing the time required to transition from one source to another source.

INDUSTRIAL APPLICABILITY

To solve the aforementioned problems, the present embodiments provide a repeater environment in which, when a transition from a first source to a second source is carried out, a video signal is delivered to the sink at the same resolution but at the minimum VRR frame rate supported by the sink until the new video signal stabilizes.

It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described as being in particular combinations, each feature or element may be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that may be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

ALTERNATE EMBODIMENTS

Alternate embodiments may be devised without departing from the spirit or the scope of the embodiments.

What is claimed is:

1. A system for fast transitioning from receiving and delivering a first video signal outputted by a first source device to receiving and delivering a second video signal outputted by a second source device, the system comprising:

(a) a repeater device connected to a sink device, the repeater device being configured to receive the first video signal and deliver the first video signal to the sink device, the first source device and the sink device being previously authenticated, the repeater device being further configured to (1) terminate delivering the first video signal to the sink device and begin authentication of the second source device, (2) during the authentication of the second source device, (A) determine that the sink device supports a variable refresh rate (VRR), (B) set a frame rate of a temporary video signal to a minimum VRR supported by the sink device, the minimum VRR supported by the sink device being less than a frame rate of the first video signal, and (C) deliver the temporary video signal to the sink device so that the sink device remains authenticated while the second source device is being authenticated, and (3) upon the completion of the authentication of the second source device, (A) discontinue delivery of the temporary video signal to the sink device, and (B) receive the second video signal and deliver the second video signal to the sink device.

2. The system of claim 1, wherein (a) the second source device is authenticated in accordance with a High-Bandwidth Digital Content Protection (HDCP) authentication protocol.

3. The system of claim 1, wherein
(a) the repeater device is further configured to read, from the sink device, data defining the minimum variable refresh rate (VRR) supported by the sink device.
4. The system of claim 1, wherein
(a) the first video signal and the second video signal are not synchronized, and
(b) the repeater device is further configured to
(A) transition, prior to the second video signal being delivered to the sink device, from a timing of the first video signal to a timing of the second video signal according to the variable refresh rate (VRR) and
(B) deliver the second video signal to the sink device.
5. The system of claim 1, wherein
(a) a frame rate of the second video signal is different than the frame rate of the first video signal, and
(b) the repeater device is further configured to, upon the completion of the authentication of the second source device,
(A) transition, prior to the second video signal being delivered to the sink device, to the frame rate of the second video signal according to the variable refresh rate (VRR), and
(B) deliver the second video signal to the sink device at the frame rate of the second video signal.
6. The system of claim 1, wherein
(a) the second video signal has a resolution different than a resolution of the first video signal, the resolution of the second video signal not being supported by the sink device, and
(c) the repeater device is further configured to
(1) scale, prior to the second video signal being delivered to the sink device, the second video signal to a resolution supported by the sink device, and
(2) deliver the scaled video signal to the sink upon achieving a video lock.
7. The system of claim 1, wherein
(a) the temporary video signal includes a repeating frame of video signal delivered at the minimum variable refresh rate (VRR) supported by the sink device.
8. The system of claim 7, wherein
(a) the repeating frame of video signal delivered at the minimum variable refresh rate (VRR) is a last frame that was delivered to the sink device of the first video signal.
9. The system of claim 7, wherein
(a) the repeating frame of video signal delivered at the minimum variable refresh rate (VRR) is one of a blank frame or a black frame of video signal.
10. The system of claim 1, wherein the repeater device comprises
(a) a switcher device including
(1) a first input connected to the first source device,
(2) a second input connected to the second source device,
(3) an output connected to the sink device, and
(4) a multiplexer configured to at least one of
(A) provide a data connection between the first input and the output,
(B) provide a data connection between the second input and the output, or
(C) provide neither a data connection between the first input and the output nor a data connection between the second input and the output.
11. The system of claim 10, wherein
(a) upon the multiplexer having a data connection with the first source device to receive the first video signal and deliver the first video signal to the sink device, the multiplexer is further configured to
(1) terminate the data connection with the first source device to terminate the delivering the first video signal to the sink device, and
(2) begin the authentication of the second source device.
12. The system of claim 11, wherein
(a) during the authentication of the second source device, the multiplexer is further configured to
(1) deliver the temporary video signal to the sink device so that the sink device remains authenticated while the second source device is being authenticated,
(2) verify that the multiplexer is authorized to receive the second video signal from the second source device,
(3) affirm to the second source device that the multiplexer is authorized to receive the second video signal, and
(4) exchange private keys with the second source device, and
(b) upon the completion of the authentication of the second source device, the multiplexer is further configured to
(1) discontinue delivery of the temporary video signal to the sink device, and,
(2) receive the second video signal and deliver the second video signal to the sink device.
13. A video distribution network, comprising
(a) a first encoder configured to receive a first video signal from a first source device and being connectable to a data network; and
(b) a second encoder configured to receive a second video signal from a second source device and being connectable to the data network;
(c) a system for fast transitioning from receiving and delivering the first video signal to receiving and delivering the second video signal, the system comprising
(1) a decoder that is connectable over the data network to at least one of
(A) the first encoder to receive the first video signal, or
(B) the second encoder to receive the second video signal,
(2) the decoder being connected to a sink device and having a data connection with the first encoder over the data network to receive the first video signal and deliver the first video signal to the sink device, the first encoder and the sink device being previously authenticated, the decoder being further configured to
(A) terminate the data connection with the first encoder to terminate the delivery of the first video signal to the sink device, and begin authentication of the second encoder over the data network,
(B) during the authentication of the second encoder,
(i) determine that the sink device supports a variable refresh rate (VRR),
(ii) set a frame rate of a temporary video signal to a minimum variable refresh rate supported by the sink device (minimum VRR), the minimum VRR being less than a frame rate of the first video signal, and
(iii) deliver the temporary video signal to the sink device so that the sink device remains authenticated while the second encoder is being authenticated, and (C) upon the completion of the authentication of the second encoder,
(i) discontinue delivery of the temporary video signal to the sink device, and
(ii) receive the second video signal from the second encoder over the data network and deliver the second video signal to the sink device.

14. The video distribution network of claim 13, wherein
(a) during the authentication of the second encoder, the decoder is further configured to
(1) deliver the temporary video signal to the sink device so that the sink device remains authenticated while the second encoder is being authenticated,
verify that the decoder is authorized to receive the second video signal from the second encoder,
(3) affirm to the second encoder that the decoder is authorized to receive the second video signal, and
(4) exchange private keys with the second encoder, and
(b) upon the completion of the authentication of the second encoder, the decoder is further configured to
(1) discontinue delivery of the temporary video signal to the sink device, and,
(2) receive the second video signal and deliver the second video signal to the sink device.

15. The video distribution network of claim 13, wherein
(a) the temporary video signal includes a repeating frame of video signal delivered at the minimum variable refresh rate (VRR) supported by the sink device.

16. The video distribution network of claim 15, wherein
(a) the repeating frame of video signal delivered at the minimum variable refresh rate (VRR) is a last frame that was delivered to the sink device of the first video signal.

17. The video distribution network of claim 13, wherein
(a) the first video signal and the second video signal are not synchronized, and
(b) the decoder is further configured to
(A) transition, prior to the second video signal being delivered to the sink device, from a timing of the first video signal to a timing of the second video signal according to the variable refresh rate (VRR) and
(B) deliver the second video signal to the sink device.

18. The video distribution network of claim 13, wherein
(a) a frame rate of the second video signal is different than the frame rate of the first video signal, and
(b) the decoder is further configured to
(A) transition, prior to the second video signal being delivered to the sink device, to the frame rate of the second video signal according to the variable refresh rate (VRR), and
(B) deliver the second video signal to the sink device at the frame rate of the second video signal.

19. The video distribution network of claim 13, wherein
(a) the second video signal has a resolution different than a resolution of the first video signal, the resolution of the second video signal not being supported by the sink device, and
(c) the decoder is further configured to
(1) scale, prior to the second video signal being delivered to the sink device, the second video signal to a resolution supported by the sink device, and
(2) deliver the scaled video signal to the sink upon achieving a video lock.

20. System for fast transitioning from receiving and delivering a first video signal outputted by a first source device to receiving and delivering a second video signal outputted by a second source device, the system comprising:
(a) a repeater device connected to a sink device, the repeater device being configured to receive the first video signal and deliver the first video signal to the sink device, the first source device and the sink device being previously authenticated in accordance with a High-Bandwidth Digital Content Protection (HDCP) authentication protocol, the repeater device being further configured to
(1) read Extended Display Identification Data (EDID) from the sink device to obtain the minimum variable refresh rate (VRR) supported by the sink device,
(2) terminate receiving the first video signal and begin authentication of the second source device in accordance with the HDCP authentication protocol,
(3) during authentication of the second source device,
(A) determine that the sink device supports a variable refresh rate (VRR),
(B) set a frame rate of a temporary video signal to a minimum VRR supported by the sink device, the minimum VRR supported by the sink device being less than the frame rate of the first video signal, the temporary video signal including a repeating frame of video signal delivered at the minimum VRR supported by the sink device, the repeating frame of video signal being one of
(i) a last received frame of the first video signal, or
(ii) a blank frame or black frame of video signal, and
(C) deliver the temporary video signal to the sink device so that the sink device remains authenticated while the second source device is being authenticated, and
(4) upon completion of authentication of the second source device,
(A) discontinue delivery of the temporary video signal to the sink device, and
(B) receive the second video signal from the second source device and deliver the second video signal to the sink device,
(C) wherein
(i) upon a frame rate of the second video signal being different than the frame rate of the first video signal,
(I) transition, prior to the second video signal being delivered to the sink device, to the frame rate of the second video signal according to the minimum variable refresh rate (VRR) supported by the sink device, and
(II) deliver the second video signal to the sink device at the second frame rate, and
(ii) upon a resolution of the second video signal being different than a resolution of the first video signal and not being supported by the sink device,
(I) scale, prior to the second video signal being delivered to the sink device, the second video signal to a resolution supported by the sink device, and
(II) deliver the scaled video signal to the sink device upon achieving a video lock, and
(iii) upon the first video signal and the second video signal not being synchronized,
(I) transition, prior to the second video signal being delivered to the sink device, from a timing of the first video signal to a timing of the second video signal according to the variable refresh rate (VRR) and (II) deliver the second video signal to the sink device.

* * * * *